(12) United States Patent
Bala et al.

(10) Patent No.: US 9,750,019 B2
(45) Date of Patent: Aug. 29, 2017

(54) CHANNEL ACCESS SYSTEMS AND METHODS FOR COGNITIVE RELAYING FOR CELLULAR SYSTEMS

(75) Inventors: Erdem Bala, Farmingdale, NY (US); Samian J. Kaur, Plymouth Meeting, PA (US); Feilu Liu, San Diego, CA (US); Rui Yang, Greenlawn, NY (US); Tao Deng, Roslyn, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 169 days.

(21) Appl. No.: 13/825,804

(22) PCT Filed: Sep. 22, 2011

(86) PCT No.: PCT/US2011/052843
§ 371 (c)(1),
(2), (4) Date: Jul. 30, 2013

(87) PCT Pub. No.: WO2012/040520
PCT Pub. Date: Mar. 29, 2012

(65) Prior Publication Data
US 2013/0294356 A1 Nov. 7, 2013

Related U.S. Application Data

(60) Provisional application No. 61/385,741, filed on Sep. 23, 2010.

(51) Int. Cl.
*H04W 72/04* (2009.01)
*H04W 16/14* (2009.01)
(Continued)

(52) U.S. Cl.
CPC ....... *H04W 72/0453* (2013.01); *H04W 16/14* (2013.01); *H04W 56/001* (2013.01);
(Continued)

(58) Field of Classification Search
CPC .............. H04W 16/14; H04W 56/001; H04W 72/0453; H04W 74/0808; H04W 88/04;
(Continued)

(56) References Cited

U.S. PATENT DOCUMENTS 7,603,594 B2   10/2009   Inoue et al.
7,706,822 B2   4/2010    Emeott et al.
(Continued)

FOREIGN PATENT DOCUMENTS

WO   WO 2008/090509 A2   7/2008

OTHER PUBLICATIONS

Buddhikot et al., "Understanding Dynamic Spectrum Access: Models,Taxonomy and Challenges", 2nd IEEE International Symposium, Apr. 17-21, 2007, 649-663.
Liu et al., "A Framework for Femtocells to Access Both Licensed and Unlicensed Bands", InterDigital Communication, May 9, 2011, 407-411.
(Continued)

*Primary Examiner* — Jae Y Lee
(74) *Attorney, Agent, or Firm* — Condo Roccia Koptiw LLP

(57) ABSTRACT

Embodiments contemplate channel access systems and methods for cognitive relaying in unlicensed and lightly licensed bands. Embodiments contemplate managing nodes of a wireless network operating in an unlicensed and or lightly licensed band. One or more embodiments may include sensing an idle channel in the unlicensed and/or lightly licensed band. Further, embodiments contemplate using the idle channel for wireless communication.

6 Claims, 26 Drawing Sheets

(51) Int. Cl.
  *H04W 56/00* (2009.01)
  *H04B 7/155* (2006.01)
  *H04B 7/26* (2006.01)
  *H04W 72/02* (2009.01)
  *H04W 74/08* (2009.01)
  *H04W 88/04* (2009.01)
  *H04W 88/06* (2009.01)

(52) U.S. Cl.
  CPC ........ *H04B 7/15542* (2013.01); *H04B 7/2606* (2013.01); *H04W 72/02* (2013.01); *H04W 74/0808* (2013.01); *H04W 88/04* (2013.01); *H04W 88/06* (2013.01)

(58) Field of Classification Search
  CPC .. H04W 88/06; H04W 72/02; H04B 7/15542; H04B 7/2606
  USPC ......................................................... 370/329
  See application file for complete search history.

(56) References Cited

U.S. PATENT DOCUMENTS

| | | | |
|---|---|---|---|
| 7,809,835 | B2 | 10/2010 | Reunamaki et al. |
| 2005/0143123 | A1 | 6/2005 | Black et al. |
| 2010/0029216 | A1* | 2/2010 | Jovicic ................ H04B 7/2615 455/68 |
| 2011/0028102 | A1* | 2/2011 | Li et al. ........................... 455/71 |
| 2011/0122808 | A1* | 5/2011 | Pandharipande .. H04B 7/15585 370/315 |
| 2011/0205980 | A1* | 8/2011 | Prakash et al. ................ 370/329 |
| 2012/0039284 | A1* | 2/2012 | Barbieri ................ H04W 48/10 370/329 |

OTHER PUBLICATIONS

"Wireless LAN Medium Access Control (MAC) and Physical Layer (PHY) Specifications", IEEE Std 802.11-2007, Jun. 12, 2007, 1232 pages.

Devroye et al., "Achievable Rates in Cognitive Radio Channels", IEE Transactions on Information Theory, Submitted Nov. 23, 2004, 29 pages.

Goldsmith et al., "Breaking Spectrum Gridlock With Cognitive Radios: An Information Theoretic Perspective", Proceedings of the IEEE. vol. 97, No. 5, May 2009, 21 pages.

Hossain et al., "Cognitive Radio: From Theory to Practical Network Engineering", Cognitive Radio Networks, chapter in Advances in Wireless Communications, Springer, 2009, 41 pages.

3rd Generation Partnership Project (3GPP), TR 36.814, V9.0.0, "3rd Generation Partnership Project; Technical Specification Group Radio Access Network; Evolved Universal Terrestrial Radio Access (E-UTRA); Further advancements for E-UTRA physical layer aspects (Release 9) ", Mar. 2010, 88 pages.

Leung et al, "Outdoor IEEE 802.11 Cellular Networks: Radio and MAC Design and Their Performance", IEEE Transactions on Vehicular Technology, vol. 56, No. 5, Sep. 2007, 12 pages.

Keysight Technologies, "Signal Studio for WLAN 802.11a/b/g/j/p/n/ac/ah", N7617B, USA, Oct. 23, 2015, 12 pages.

"Part 11: Wireless LAN Medium Access Control (MAC) and Physical Layer (PHY) Specifications", IEEE Std 802.11-2012, Mar. 29, 2012, 2793 pages.

Mitola et al., "Cognitive Radio: Making Software Radios More Personal", IEEE Personal Communications, IEEE Personal Communications, vol. 6, Issue 4, Aug. 1999, 6 pages.

Sayrac et al., "Flexible and Spectrum Aware Radio Access through Measurements and Modelling in Cognitive Radio Systems", ICT-248351, FARAMIR, Document No. D2.4, Dec. 31, 2011, 100 pages.

* cited by examiner

CHANNEL ACCESS SYSTEMS AND METHODS FOR COGNITIVE RELAYING FOR CELLULAR SYSTEMS

CROSS REFERENCE TO RELATED APPLICATIONS

This application is the National Stage of International Application No. PCT/2011/052843, filed Sep. 22, 2011, titled "Channel Access Systems and Methods for Cognitive Relaying for Cellular Systems", which claims the benefit of U.S. Provisional Patent Application No. 61/385,741, titled "Channel Access Systems and Methods for Cognitive Relaying in Unlicensed Bands", filed on Sep. 23, 2010, the content of both applications being hereby incorporated by reference herein, for all purposes.

BACKGROUND

Spectrum may be available for communication nodes and operators of such nodes in both unlicensed bands and lightly licensed bands. The Federal Communications Commission (FCC) conceived the license-exempt bands (e.g., unlicensed bands) to provide a portion of public access spectrum at no licensed cost.

The FCC has also established the lightly licensed bands in which licensees may pay a small fee for a nationwide, non-exclusive license for certain public access spectrum. Those that take such licenses may then pay an additional nominal fee for each node that may deployed. Such client nodes may be fixed or mobile. Neither the nodes nor their operators may require an additional license.

SUMMARY

This Summary is provided to introduce a selection of concepts in a simplified form that are further described below in the Detailed Description of Illustrative Embodiments. This Summary is not intended to identify key features or essential features of the claimed subject matter, nor is it intended to be used to limit the scope of the claimed subject matter.

Embodiments contemplate options for use of unlicensed or lightly licensed spectrum by cellular systems. For example, embodiments contemplate the use of the Physical layer (PHY) and/or Medium Access Control (MAC) layer of a legacy system operating in the unlicensed spectrum (such as a 802.11 based system, for example) and fragment/combine the transmitted/received traffic on the licensed and unlicensed band above the PHY/MAC layers. Also by way of example, embodiments contemplate the design of a specific PHY and/or MAC layers for the unlicensed spectrum based on respective cellular standards (for example LTE) and change the higher layers to fragment/combine the traffic.

The design of a specific PHY and/or MAC layers may provide for a number of capabilities or features he. For example, embodiments recognize that:

802.11 technologies may operate only in certain bands while the total amount of unlicensed or lightly licensed spectrum is much larger. Therefore 802.11 technologies approach may result in spectrum restrictions.

The spectral efficiency of LTE may be much higher than other standardized technologies that are designed for devices operating in the unlicensed band. The advanced features in PHY and MAC in LTE may not exist in some 802.11 technologies. Also, the PHY layers may not be totally compatible. For example, the cyclic prefix and OFDM symbol lengths of 802.11 are much smaller than those of LTE. This may restrict the use of 802.11 technologies to environments where delay spread may be much smaller than those in cellular environments.

802.11 may aim to design an ad hoc network and therefore may use certain protocols to minimize collision where these protocols are distributed, for example carrier sense multiple access with collision avoidance (CSMA/CA). Although there may be a need to use similar approaches for coexistence purposes, a tighter coordination among the cellular nodes (for example managed by the cognitive transmitter such as the relay node) may be used to design more efficient medium access protocols.

Embodiments recognize that several networks may exist simultaneously in the same spectrum. The spectrum could be unlicensed or lightly licensed; or could be licensed where the operator leases it to cognitive users. One or more embodiments contemplate techniques that may manage coexistence among cellular and other users may be applicable to a wider range of problems/scenarios.

WiFi offloading may be used because operators may want to take the advantage of using the unlicensed spectrum while they may not have full control over the WiFi communications. If a cellular standard supports communications over licensed and unlicensed bands, full control over the transmission may improve the efficiency (for example by using intelligent relaying schemes which will utilize the licensed and unlicensed spectrum in an optimal way under the same controller).

Embodiments recognize that multi-tier heterogeneous networks, where secondary nodes may create smaller cells overlaid on the cellular cell, are supported in LTE-A and other standards. The secondary cells may re-use the cellular spectrum with the primary network and enhance spectral efficiency. Because of the spectrum sharing property, embodiments contemplate that interference may need to be addressed with intelligent interference management techniques. Embodiments recognize schemes that may concentrate on resource orthogonalization between the primary and secondary networks. Embodiments contemplate cognitive cooperation that may improve system performance by applying appropriate interference management techniques, efficient utilization of the spectrum, and/or cooperation between the primary and secondary nodes. In current cellular standards, the bandwidth has grown significantly; up to 100 MHz for downlink and uplink in LTE-A. Efficient utilization of this spectrum and spectrum in bands other than the cellular band (for example other licensed bands and/or unlicensed bands) is contemplate by one or more embodiments.

Embodiments recognize methods that may enable cognitive nodes to use the resources of primary systems such as cellular systems, television transmission systems, etc., for example. Embodiments contemplate that cognitive radio techniques may also be used to improve the performance of cellular systems. In one or more embodiments, some nodes of the primary system, which for example may be the cellular system, may have cognitive radio capabilities. Relays and other low power transmission nodes such as picocells, femto cells, may have certain cognitive radio capabilities. Also, in one or more embodiments, the traditional cellular model may be extended to include direct communications between the wireless transmit/receive units (WTRUs, which may be referred to as User Equipment (UE). WTRUs could work as helpers to traditional cellular connections to facilitate improved spectral efficiency, coverage, and/or energy efficiency. The helper WTRUs may be intermediate nodes that help deliver data to and from the end-user WTRU. The helper WTRU could work as a simple relay or a cooperative relay, for example. Embodiments contemplate techniques that may be enable use of the new spectrum in the crosslink, between the WTRUs in both directions.

For simplicity, in the rest of the present disclosure, the term "relay node" may be used to refer to either an infrastructure relay or a helper WTRU. Cognitive relays may improve the system performance by relaying the data of the primary users by dynamically accessing under-utilized spectrum. As opposed to the traditional relays, embodiments contemplate that cognitive relays may also have their own data to be transmitted to the cognitive receivers.

Embodiments contemplate channel access systems and methods for cognitive relaying in unlicensed bands. Particularly, the one or more embodiments may provide systems and methods to enable access to the unlicensed (and lightly licensed) spectrum by cellular nodes. The communications over the licensed and unlicensed bands may be between a central node (such as an infrastructure relay, picocell, base station, etc.) and mobile terminals or between mobile terminals.

Embodiments contemplate that cognitive radios may utilize radio and signal processing technologies to support new wireless users (cognitive or secondary users) in the existing spectrum without degrading the performance of incumbent users (e.g., primary users). These radios may use intelligent spectrum allocation policies to support the new users while using novel interference management and cooperation techniques. Embodiments recognize that Bluetooth and 802.11 operating in unlicensed bands may need to obey rules such as maximum transmit power and a shared channel access mechanism. Embodiments contemplate that cognitive users may operate both in licensed and unlicensed bands but use advanced technology so that minimal impact may be made to the non-cognitive users.

Embodiments contemplate techniques and methods for cognitive relaying in the next generation cellular systems. Embodiments contemplate the coexistence of networks in the same spectrum. These networks could be of different types, for example cellular systems and ad hoc networks in unlicensed spectrum. Or, these networks may include cognitive nodes using the cellular spectrum; or of the same type, for example cellular systems of different operators. Embodiments contemplate techniques that may control interference and manage sharing of the spectrum. The contemplated techniques may be designed so that different networks may be able to operate in the same spectrum without significantly degrading the performance of each other.

Embodiments contemplate channel access systems and methods for cognitive relaying in unlicensed bands. One or more embodiments contemplate managing nodes of a wireless network operating in an unlicensed band. Embodiments may include sensing an idle channel in the unlicensed band. Embodiments may also include using the idle channel for wireless communication.

Embodiments contemplate a wireless transmit/receive (WTRU) device that may be configured, at least in part, to establish communication. The WTRU configuration may comprise sending a signal to a physical (PHY) layer from at least one higher layer, and selecting a first access opportunity for a first channel in a first frequency band in response to the signal. Embodiments also contemplate that the WTRU configuration may include determining a state of the first channel, and may also include determining a second channel in a second frequency band upon a determination that the state of the first channel is idle. The WTRU configuration may include sending a signal to a recipient device via the second channel. Embodiments contemplate that the signal may include information for reception via the first channel of data corresponding to the information.

Embodiments contemplate a wireless transmit/receive device (WTRU) that may be configured to establish communication. The WTRU configuration may include sending a signal to a physical (PHY) layer from at least one higher layer, and selecting a first access opportunity for a first channel in a first frequency band in response to the signal. Embodiments contemplate that the configuration may include determining a state of the first channel, and determining a second channel in the first frequency band upon a determination that the state of the first channel is idle. Embodiments contemplate that the WTRU configuration may include sending a signal to a recipient device via the second channel. The signal may include information for reception via the first channel of data corresponding to the information. Embodiments also contemplate that the first frequency band may be at least one of an unlicensed band or a lightly-licensed band.

Embodiments contemplate a wireless transmit/receive device (WTRU) that may be configured to establish communication. Embodiments contemplate that the WTRU configuration may include detecting a first access opportunity for a first frequency band. The WTRU configuration may include monitoring for a preamble in the first access opportunity. The WTRU configuration may include starting a timer upon the detection of the first access opportunity. The WTRU configuration may include synchronizing with a transmitting device upon a detection of the preamble. The WTRU configuration may include decoding a control channel in the first frequency band upon the detection of the preamble. Embodiments contemplate that the first frequency band may be at least one of an unlicensed band or a lightly-licensed band.

BRIEF DESCRIPTION OF THE DRAWINGS

A more detailed understanding may be had from the following description, given by way of example in conjunction with the accompanying drawings wherein.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1A:
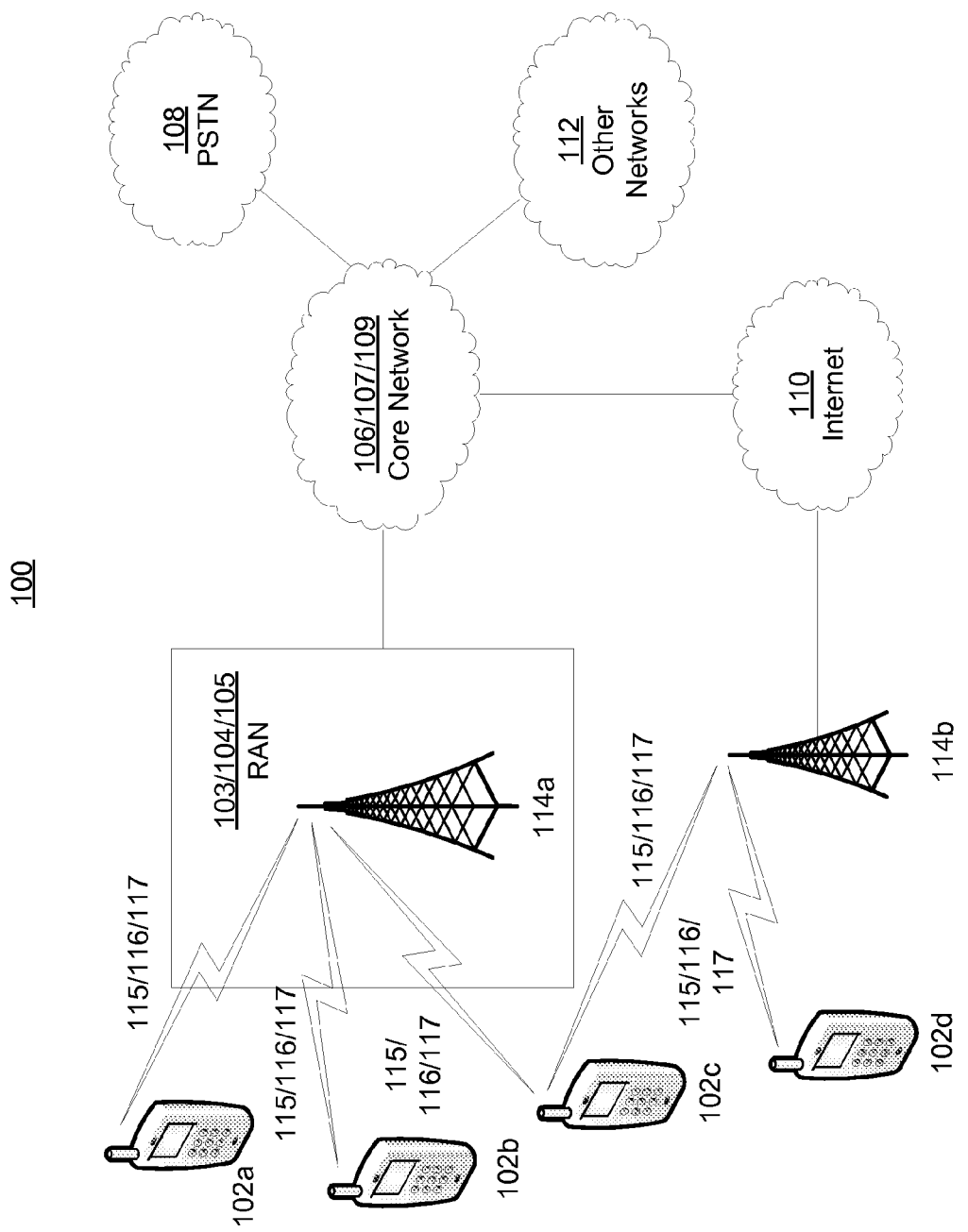
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
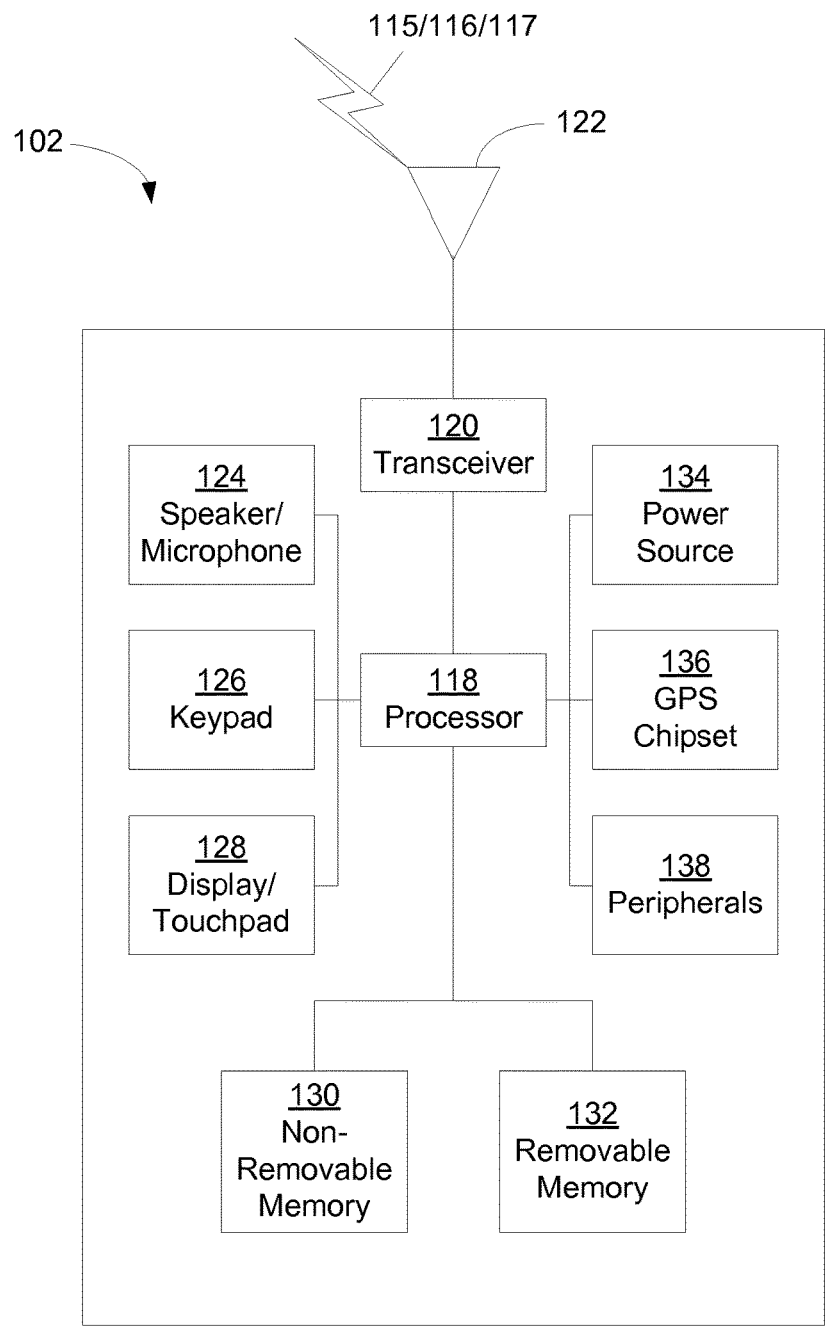
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
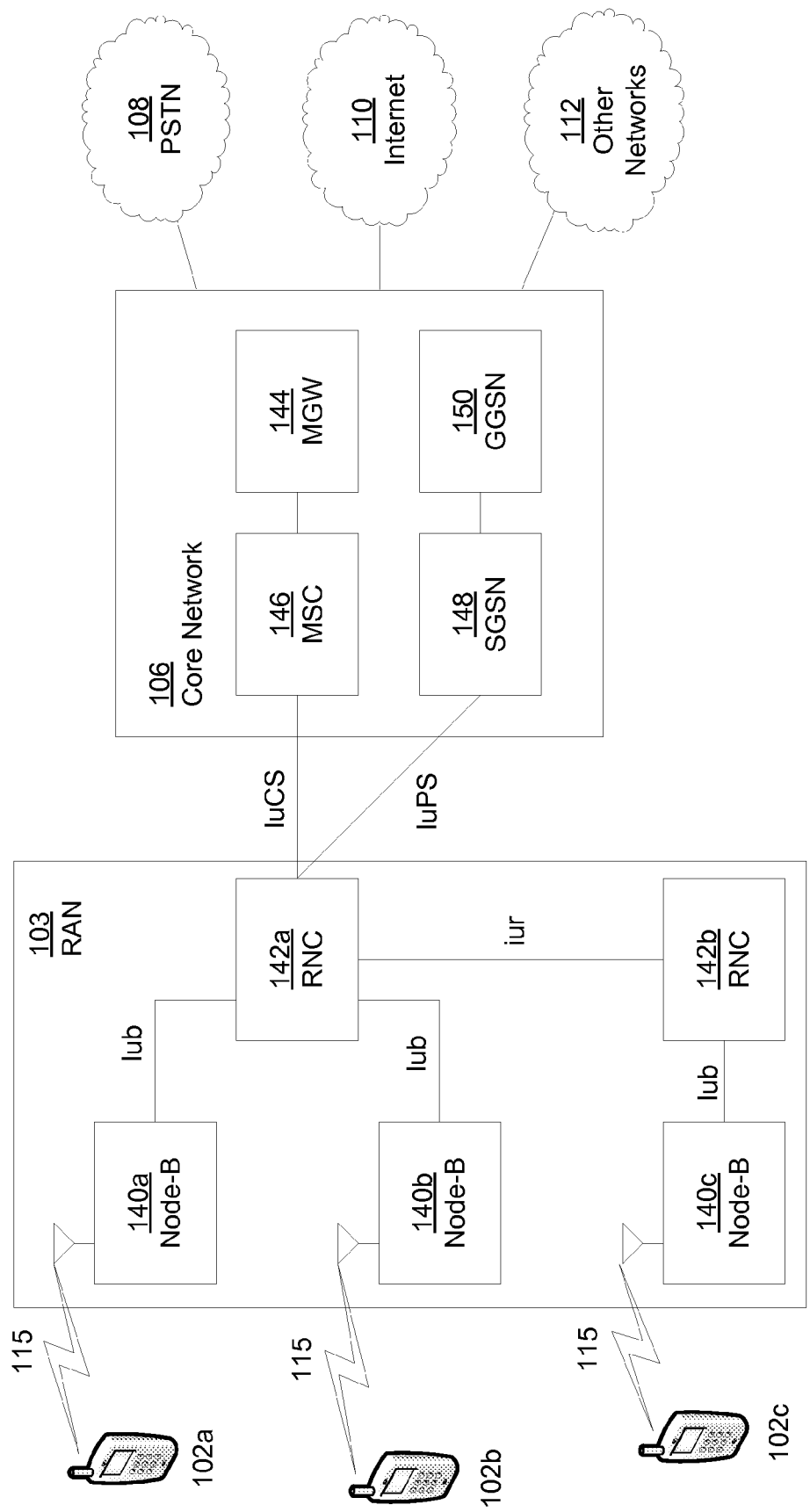
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
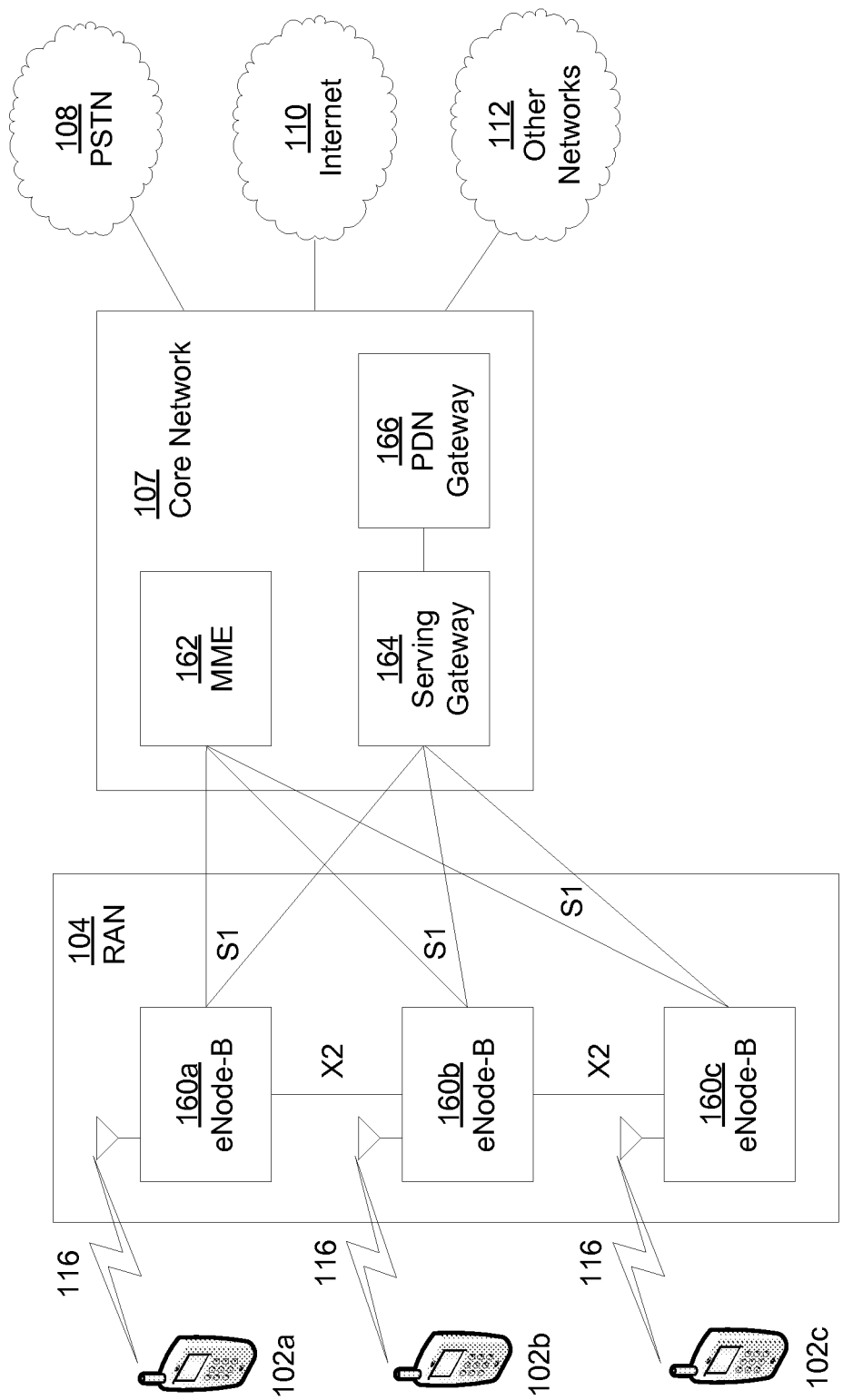
FIG. 1D is a system diagram of another example radio access network and an example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
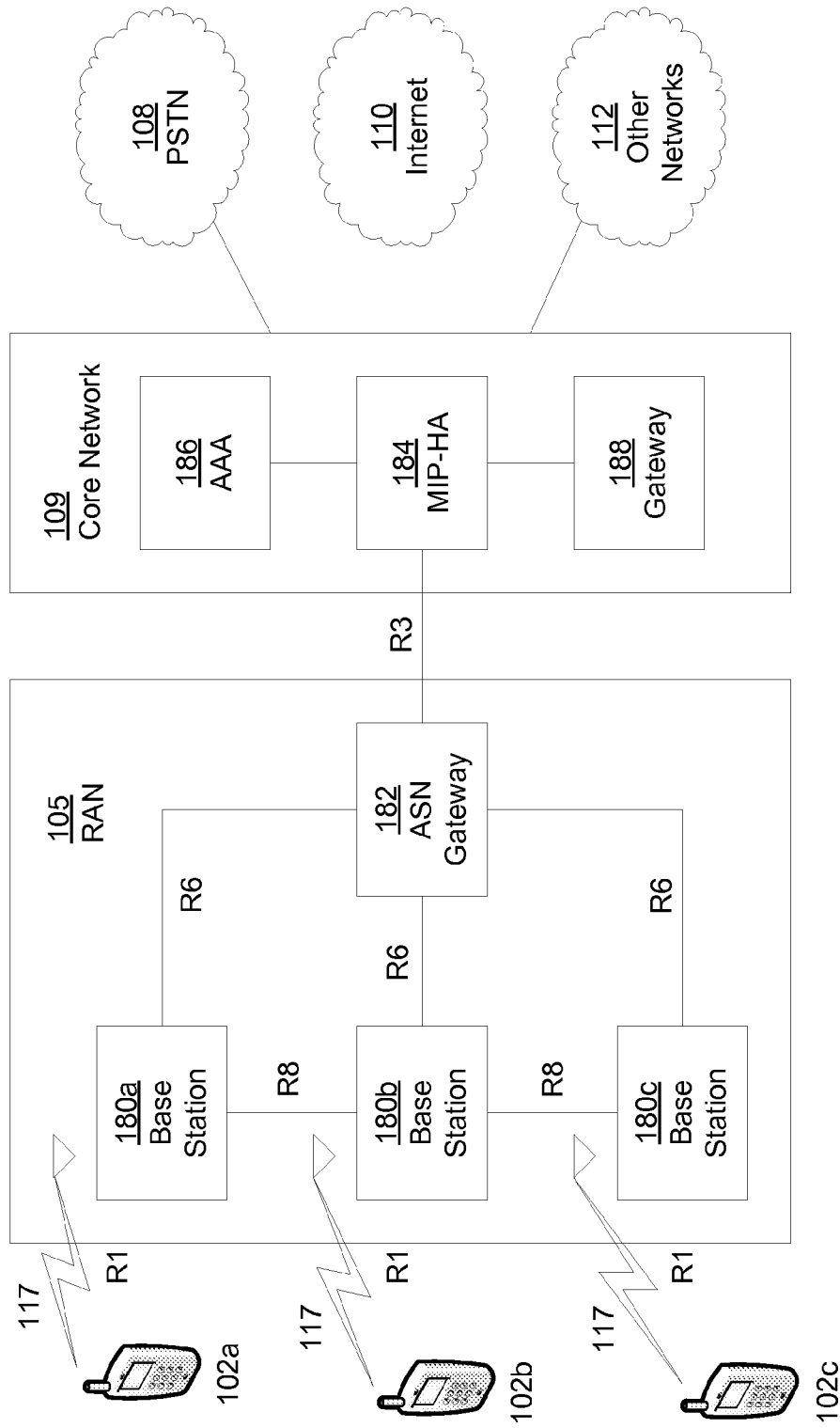
FIG. 1E is a system diagram of another example radio access network and an example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, and 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, and 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, and 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

Figure 1F:
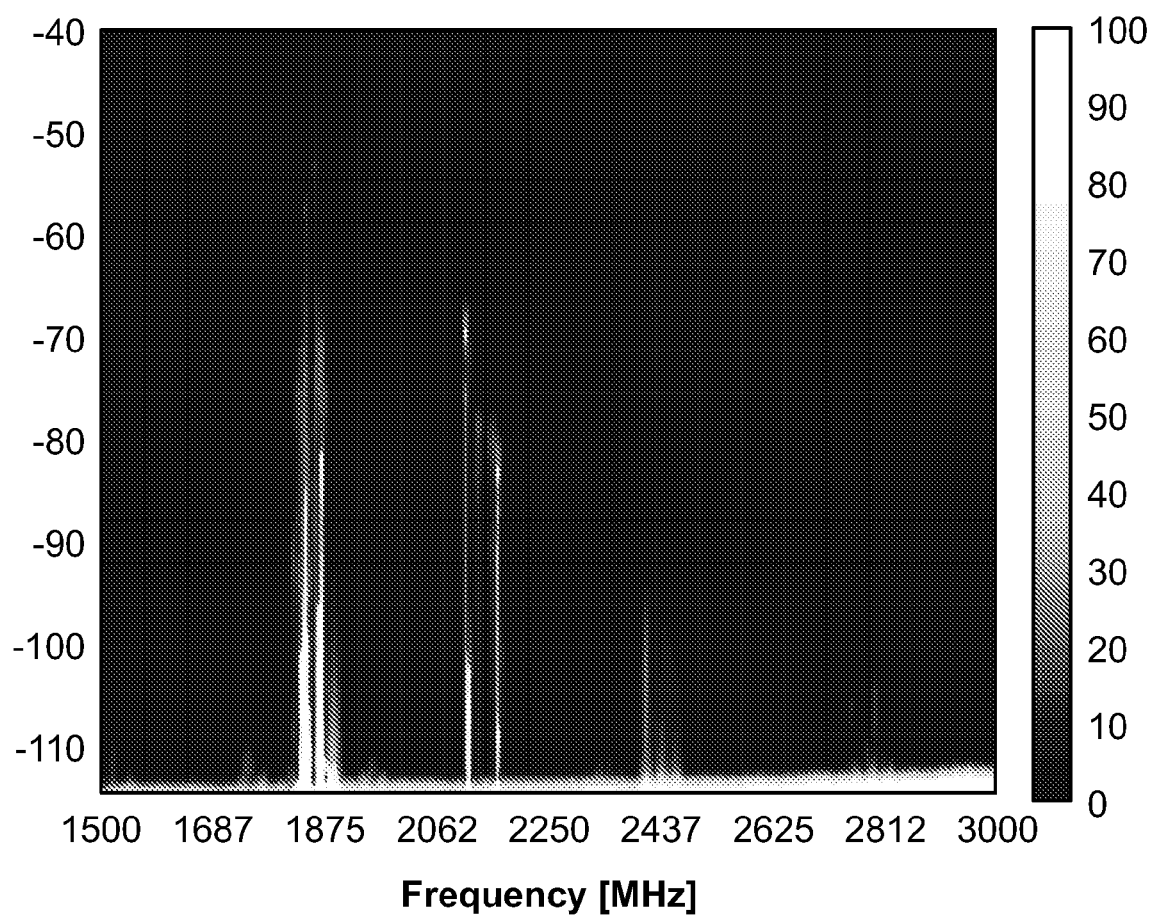
FIG. 1F shows an illustration of the spectral usage landscape in Europe which may be used by embodiments.

Embodiments contemplate that, perhaps because of the increasing number of users and data-rich applications, licensed spectrum availability may be limited in near future, and it would be beneficial to enable users to seamlessly and opportunistically roam across various wireless access networks in the search for more throughput and/or cheaper bandwidth. Embodiments recognize that close to half of the allocated spectrum space is unutilized and/or under-utilized. By way of example, and not limitation, FIG. 1F shows an exemplary illustration of the vast spectral usage landscape in Europe.

Embodiments contemplate that secondary utilization of unused spectrum may require efficient detection and sharing without harmful interference with other users. For these and other reasons, embodiments contemplate a cognitive radio which may be defined as a communication system that collects information such as channel conditions, spectrum availability, activity, codebooks, messages of other nodes with which it shares the spectrum, etc., from its environment.

Embodiments contemplate systems and methods for adapting transmission according to a dynamic radio environment to improve utilization of limited radio resources.

Embodiments contemplate methods and systems by which cognitive radios may improve system performance by intelligently utilizing information such as, but not limited to, channel conditions, spectrum availability, activity, codebooks, messages of other nodes with which it shares the spectrum, etc. from the environment. Contemplated cognitive radio transceivers may be able to adapt its transmission according to the dynamic radio environment to maximize the utilization of the limited radio resources while providing flexibility in wireless access, for example.

Figure 2:
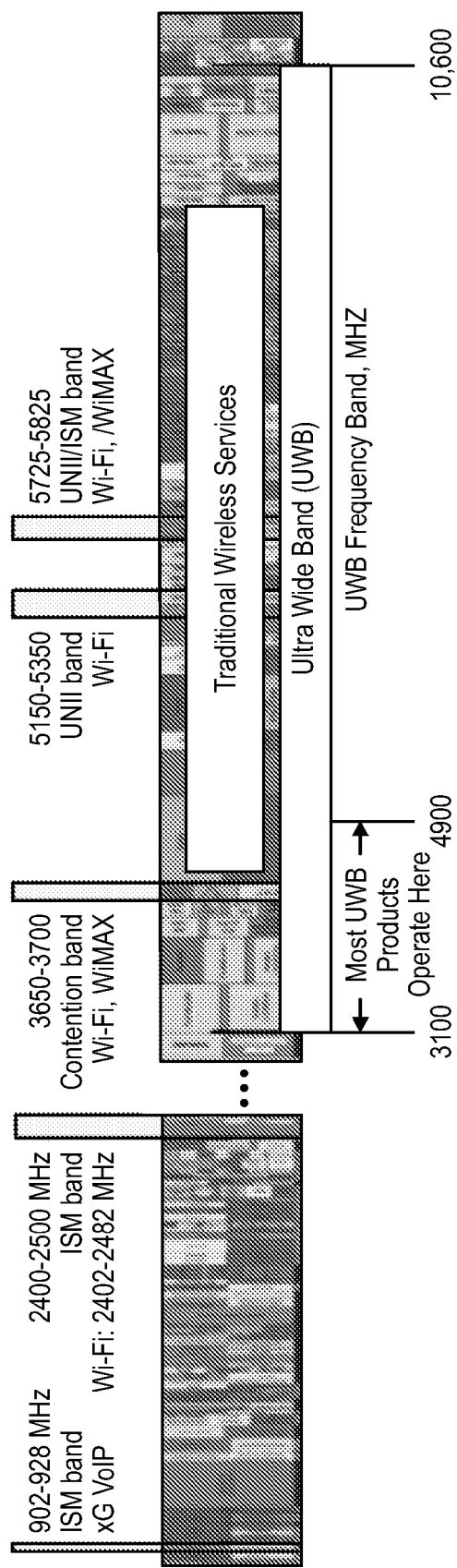
FIG. 2 is a band showing unlicensed wireless bands in the U.S. which may be used by embodiments.

FIG. 2 illustrates a graph of unlicensed bands in the United States (US) and the legacy or other protocols that may operate in the various illustrated bands. These bands are broadly regulated under the industrial, scientific, and medical (ISM) and the Unlicensed National Information Infrastructure (U-NII) regulations, both defined by the FCC.

Embodiments contemplate that cognitive behavior may be grouped into three categories, for example, and each of which may exploit varying degrees of knowledge of the wireless environment at the cognitive users:

Overlay cognitive radio: Cognitive and primary nodes may transmit concurrently by means of some kind of cooperation. Cognitive nodes, for example, may help the primary nodes complete the primary transmissions faster and then utilize the vacant resources to send their own messages.

Underlay cognitive radio: Cognitive nodes may operate simultaneously with the primary nodes with the potential condition that the transmission of the primary users is not disrupted by the cognitive nodes. For example, cognitive nodes may transmit in the primary spectrum but with very low power.

Interweave cognitive radio: Cognitive nodes may find and use spectral holes not used by the primary transmitters.

Embodiments also recognize there may be different possible parts of spectrum to choose from for transmission by cognitive radio node. In one or more embodiments, it may be assumed that unlicensed bands are available for the radio node (unlicensed band cognitive radio), and perhaps in some embodiments only unlicensed bands are available. Also, in one or more embodiments, licensed bands may also available (e.g., lightly licensed and/or unlicensed bands). Embodiments contemplate that cognitive radio may allow usage of unused unlicensed bands by cellular LTE relay node devices and terminals.

Embodiments contemplate systems and methods that address relaying protocols and system design considerations that may enable cognitive use of unlicensed/lightly licensed spectrum by cellular nodes. Specifically, embodiments contemplate extensions for one or more cellular protocols that may allow sensing based access of the unlicensed or lightly licensed spectrum. Embodiments also contemplate that general solutions/techniques that may enable spectrum sharing among networks may be applicable to other scenarios as well (for example dynamic sharing of the cellular spectrum). Unlicensed spectrum may be used by other communications devices. Specifically, the 2.4 GHz and the 5 GHz ISM bands may be used by 802.11 local area networks besides some other networks, for example. Embodiments recognize that the cellular network may not know if and/or how the unlicensed band may be used via any communication techniques between them, if any.

Embodiments contemplate that when cellular devices also start using these bands, the system may be implemented such that the effect of the cellular communications on the incumbent networks can be minimal. As an example, cellular nodes may not create excessive interference on the incumbent nodes or disturb ongoing transmissions significantly. Embodiments recognize that local area networks usually use a "listen before talk" protocol for channel access to minimize collisions. Cellular nodes may be able to use similar techniques so that the unlicensed channel may be used when it is free. Embodiments contemplate approaches that may be different from the cellular architecture where the medium access is controlled by a central transmitter. Embodiments contemplate one or more sensing and accessing mechanisms.

Embodiments contemplate that the use of the one or more new bands would have been useful for cellular communications. For example, embodiments contemplate the reduction of the interference in the cellular system. More specifically, embodiments contemplate that cognitive relaying may be used to reduce the interference on one or more cell-edge WTRUs by utilizing the newly available spectrum to transmit part (or all) of the primary node's (e.g., base station's) message. The cognitive relay may achieve this by transmitting with reduced (or perhaps zero) power, or use less frequency resources (e.g., carrier frequencies/PRBs) in the cellular band and compensate for the loss by transmitting in the new spectrum.

Embodiments contemplate that the WTRU that may receive transmission from the cognitive relay may experience less interference in the new spectrum. As an example, if the band is the ISM band and a medium access scheme based on interference avoidance and carrier sensing as described herein is used, this may result in more favorable interference-free conditions than the cellular spectrum. Embodiments also contemplate that with this kind of transmission, the interference in the cellular band due to the relay transmission may be reduced resulting in an improvement in the capacity of other primary cell-edge nodes. In fact, the reduced interference may benefit one or more WTRUs, and in some embodiments perhaps all the WTRUs, of the whole network, but the closest nodes may experience the largest benefits.

Embodiments also contemplate capacity improvement. Cognitive relays may use the extra available spectrum to transmit additional data to increase the capacity of the cell-edge WTRUs. For example, the cognitive relay may transmit additional bits to the WTRU through the new spectrum and improve the capacity of the WTRU. Depending on the relaying technique, capacity may be enhanced without increasing the total transmit power.

One or more embodiments may enable the access and use of the unlicensed spectrum for transmission and reception by cellular devices. Embodiments recognize that channel access mechanisms may differ in the downlink and uplink directions. In the downlink, the cellular user may have to contend with other cellular and non-cellular users of the spectrum. In the uplink direction, several WTRUs trying to communicate with a common receiver may attempt to access the channel simultaneously resulting in collisions. Therefore, embodiments contemplate avoiding or minimizing the resulting collisions. In the present disclosure, downlink is defined as the direction from the relay to the WTRUs and uplink is defined as the direction from the WTRUs to the relay. The relay may be an infrastructure relay or simply a WTRU operating as a relay. When the relay is also a WTRU, it is called a helper WTRU and the downlink and uplink definitions apply similarly. The downlink and uplink transmissions (or transmit/receive) may be multiplexed in time as in Time Domain Duplexing (TDD) systems or in frequency as in Frequency Domain Duplexing (FDD) systems.

Embodiments contemplate channel access mechanisms for the cellular nodes operating in an unlicensed band. One or more of the contemplate channel access mechanisms may generally include at least two parts; contention with the nodes operating in the same spectrum that may use different protocols or with the nodes that use the same protocol but may not be able to communicate with each other; and contention among the WTRUs to access the spectrum. The first part may include carrier sensing and other methods to identify an idle channel. The second part may include methods that enable simultaneous usage of the idle channel (perhaps as in the uplink direction where several WTRUs may need to communicate with a single receiver). The downlink and uplink communications among the cellular nodes in the unlicensed spectrum may be separated in the frequency or time domains. FDD or TDD may be used for this purpose.

Figure 3:
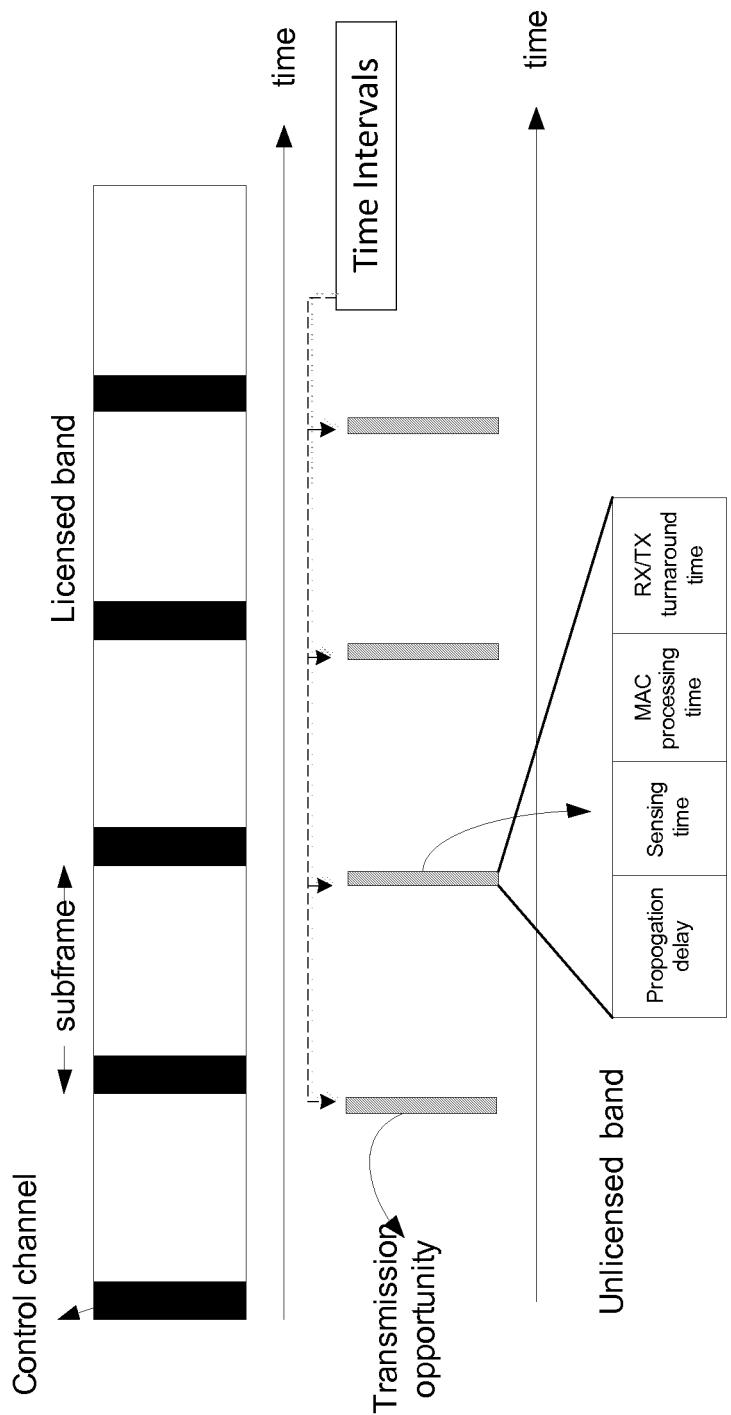
FIG. 3 is a band spectrum showing time intervals in the unlicensed band consistent with embodiments.

Embodiments contemplate access opportunities may be fixed (e.g. in time) or semi-statically configured. An example is shown in FIG. 3 where the time intervals denoted as indicated in the unlicensed band may be access opportunities. These intervals may be candidate points in time when the transmitter may start sensing the channel and initiate a transmission in the unlicensed band if the channel is found to be idle, for example. The time interval may be large enough to compensate for sensing, MAC processing, propagation delays, and/or RX/TX turnaround time, for example. To be able to sense one or more, or all, WiFi transmissions, the total sensing interval may be larger than the Short Interframe Space (SIFS) duration. If the sensing interval may not be continuous, then the difference between first and last points in time when sensing is performed may be larger than the SIFS duration.

In one or more embodiments, it may be assumed that the subframe timing in the unlicensed band is known. This may be achieved by deducing the timing in the unlicensed band from the timing of the licensed band. In this case, the beginning of a subframe and/or OFDM symbol in the unlicensed band may have a fixed offset to the beginning of a subframe and/or OFDM symbol in the licensed band. One or more, and perhaps all, of the cellular nodes operating in the unlicensed band may be synchronized. This is achieved because these nodes may attain time and frequency synchronization from the licensed band.

Points in time may be defined that may be specific access opportunities. An "access opportunity" is defined as a time interval when the node intending to initiate a transmission may sense the channel to see if it is available, and starts transmission if the channel is found to be idle.

In one or more embodiments, access opportunities may be fixed or semi-statically configured. An example is shown in FIG. 3 where the indicated time intervals in the unlicensed band may be access opportunities. These intervals may be candidate points in time when the transmitter may start sensing the channel and initiate a transmission in the unlicensed band if the channel is found to be idle. The time interval may be large enough to compensate for sensing, MAC processing, propagation delays and RX/TX turnaround time. To be able to sense one or more WiFi transmission, or perhaps all WiFi transmissions, the total sensing interval may be larger than the SIFS duration. If the sensing interval may not be continuous, then the difference between first and last points in time when sensing is performed may be larger than the SIFS duration, for example.

Figure 4:
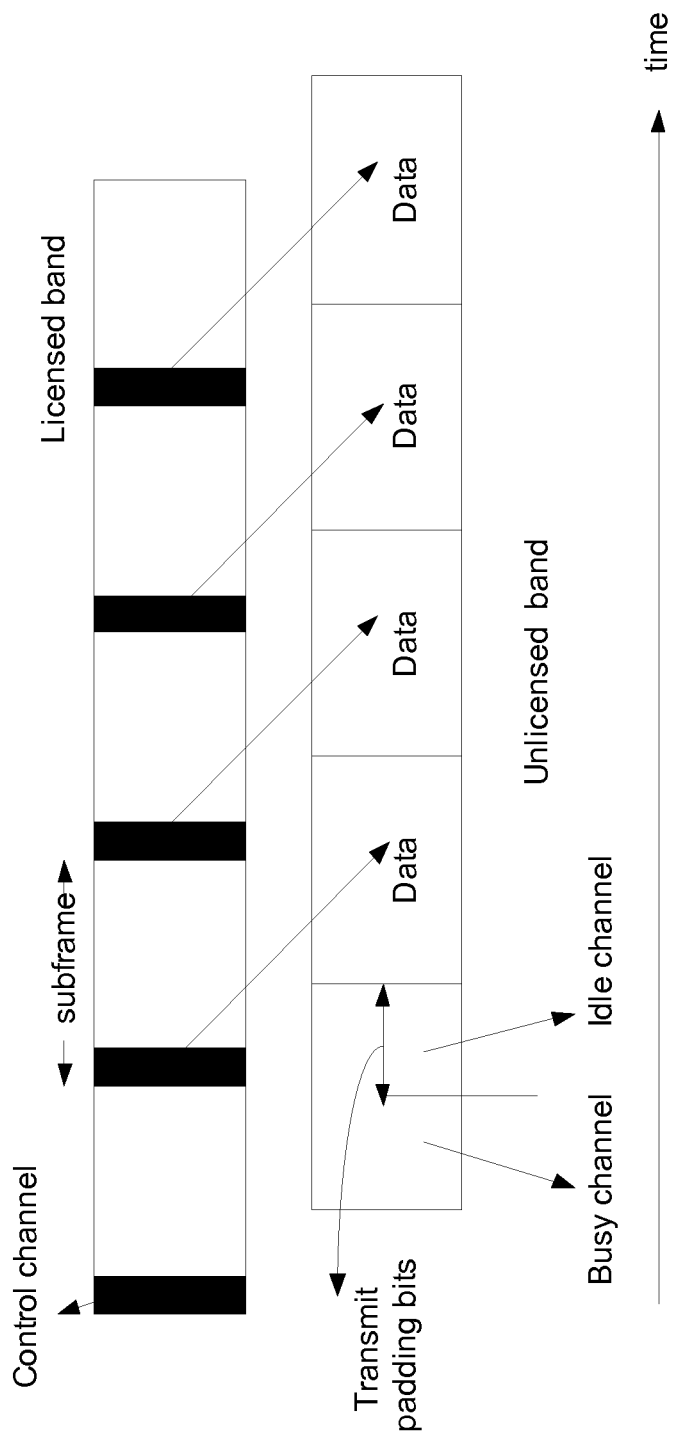
FIG. 4 is a band spectrum showing where control data may be transmitted in the licensed band and maps to a specific subframe in the unlicensed band consistent with embodiments.

In addition to the channel access mechanism, the corresponding frame structure and control signaling to support transmission in the unlicensed band also may be specified. One or more embodiments contemplate that the control signaling may be transmitted in the licensed band, and in some embodiments perhaps only in the licensed band (similar to control signaling when component carrier aggregation may be used in LTE-Advanced). The transmission that takes place in the unlicensed band may be controlled by the signaling in the licensed band. To achieve this, the subframe timings of the licensed and unlicensed bands may have a fixed offset. This is illustrated in FIG. 4 where the control data may be transmitted in the licensed band and may map to a specific subframe in the unlicensed band.

When this approach is used, embodiments contemplate that there may be a gap between the time when the channel is sensed and found to be idle and the time when the control data is transmitted in the licensed band. The transmitter may occupy the channel in the unlicensed band during this gap to ensure that the channel may be available when the control data is transmitted. One or more embodiments contemplate transmitting some data, such as padding bits, during this gap. One or more embodiments may assume that the receivers are not aware of any transmission until they decode the control channel. After the receivers decode the control channel, they can get the corresponding transmission in the unlicensed band. From this point on, transmission may continue in a regular manner as illustrated in FIG. 4.

Embodiments contemplate one or more procedures for a transmitting node may include the PHY layer of the transmitter receiving a request from the MAC and/or higher layers to sense the unlicensed band for a possible transmission. An access opportunity may be chosen and sensing may be performed. Embodiments also contemplate that if the channel is found to be busy, the transmitter may waits for the next access opportunity to sense the channel. Embodiments contemplate that the determination that a transmitter is in a "busy" state may include determining that the transmitter may be transmitting, among other activities. Embodiments recognize that when a channel is in a busy state, at least one transmitter may be emitting energy in that channel in the area of interest, for example. Further, embodiments contemplate that if the channel is found to be idle, the transmitter may start transmitting padding bits in the idle channel to keep the channel busy. The padding bits may include random data or a known preamble (like an 802.11 preamble, for example) to allow other users (e.g., 802.11) of the spectrum to adjust their Network Allocation Vector (NAV). Embodiments also contemplate that in the next available control channel in the licensed band, the transmitter may send the necessary allocation information to the scheduled WTRUs for reception in the unlicensed band. The corresponding data in the scheduled resources may be transmitted in the unlicensed band.

Embodiments contemplate one or more procedures for receiving nodes may include the receiving node receiving and decoding the control channel in the licensed band. Further, embodiments contemplate that if resources are scheduled in the unlicensed band, the receiving nodes may start receiving in the unlicensed band and perform the required receive operations. The corresponding feedback, such as ACK/NACK or channel state/quality information may be transmitted in the licensed band. Also, embodiments contemplate that if a preamble that may be decoded by 802.11 nodes is transmitted, for example, then the preamble may be used to reserve the channel for a specific amount of time by setting the packet length data field in the preamble. In this case, two way communications may proceed until the end of the specified time.

Embodiments contemplate that as the amount of traffic in the channel becomes higher, latency in accessing the channel may increase due to the low probability of finding the channel available at a given access opportunity. This may require that higher layers forward delay-tolerant data on this channel so that quality of service may not be degraded.

Figure 5:
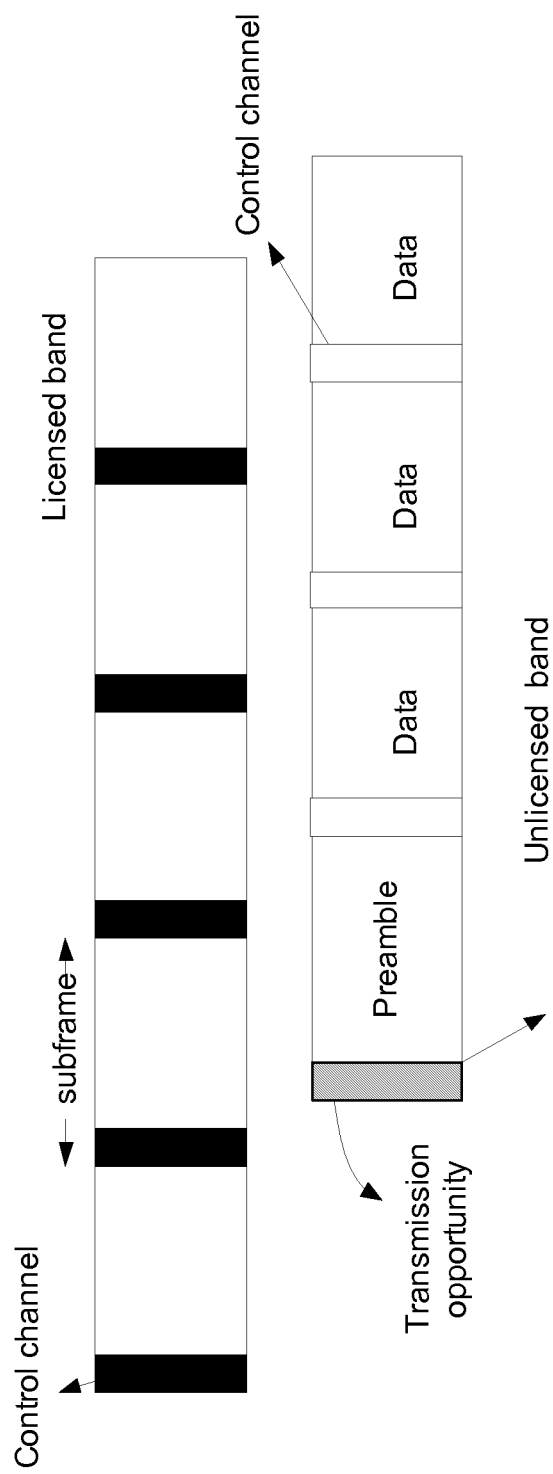
FIG. 5 is a band spectrum showing exemplary bands consistent with embodiments.

Embodiments contemplate one or more methods in which control signaling may be transmitted in the unlicensed band. Embodiments contemplate that the transmitter may start sensing the channel at a specified access opportunity. If the channel is found to be idle, then the transmitter may start transmitting a preamble in the unlicensed band as shown in FIG. 5. The preamble may be a sequence known by the transmitter and some or all of the receivers and may be used to inform the receivers of an incoming transmission. The preamble may also be used for synchronization.

Embodiments contemplate that the transmitter may not inform the receivers in the control channel of the licensed band; so the receiving nodes may be continuously receiving in the unlicensed band and processing the incoming signal to decode the preamble sequence. The access opportunities may be known by some or all the nodes and a preamble search may be performed by some or all of the receive nodes around these intervals. If the preamble cannot be found, receiving may be terminated and postponed until the next opportunity, for example.

Embodiments contemplate that the preamble may be similar to the synchronization sequence used in LTE and may be transmitted in a portion of the total bandwidth of the channel, for example. In addition to indicating the beginning of a transmission, the sequence may also be used for frequency synchronization. After the receivers decode the preamble, the data transmission may start. One or more control channels may be transmitted in the unlicensed band followed by data transmission.

Embodiments contemplate one or more procedures for transmitting node that may include the PHY layer of the transmitter receiving a request from the MAC and/or higher layers to sense the unlicensed band for a possible transmission. An access opportunity may be chosen and sensing may be performed. Embodiments contemplate that if the channel is found to be busy, the transmitter may wait for the next access opportunity. Also, embodiments contemplate that if the channel is found to be idle, the transmitter may start transmitting a preamble in the idle channel. The preamble may include specific sequence(s) that may be known by the receiving nodes. Embodiments contemplate that data transmission may start in the unlicensed band. In one or more embodiments, control signaling may be transmitted in the unlicensed band prior to the data. Alternatively or additionally, in one or more embodiments, control signaling may be transmitted in the licensed band as described in previous embodiments.

Embodiments contemplate one or more procedures for receiving nodes that may include—during an access opportunity—the receiving nodes may start receiving in the unlicensed band and may search for the preamble. A timer may also be started to measure the time spent for searching the preamble. Embodiments also contemplate that if the preamble is not detected and/or the timer expires, preamble searching may be terminated and/or postponed until the next opportunity. Embodiments also contemplate that if the preamble is detected, then synchronization may be achieved. Embodiments also contemplate that control channel may be decoded to find out the properties of the incoming transmission in the unlicensed band, among other reasons. The control channel may be transmitted in the unlicensed band prior to the data transmission or in the licensed band. Embodiments contemplate that the corresponding feedback, such as ACK/NACK or channel state/quality information, for example, may be transmitted in the licensed band.

In the one or more embodiments, the transmitter may sense the channel at fixed and/or predefined intervals. Embodiments also contemplate that the channel may be idle or busy at these intervals. Embodiments recognize that if the traffic in the channel is not high, then the probability of finding the channel idle at these intervals may be large. However, at highly loaded channels, the channel may be used most of the time. By way of example, and not limitation, such embodiments may be referred to as variable-time sensing (or continuous sensing) techniques.

Figure 6:
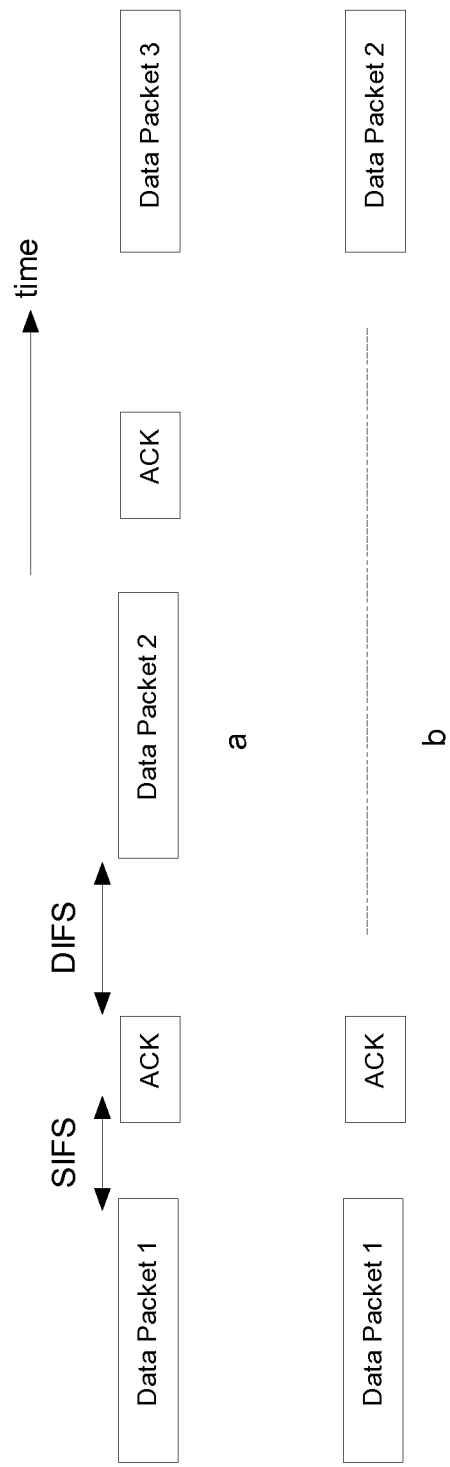
FIG. 6 illustrates the events in time that may occur in a regular WiFi network consistent with embodiments.

FIG. 6 illustrates the events in time that may occur in a regular WiFi network, for example. In a highly loaded system as illustrated in part "a" of FIG. 6, after a data packet is transmitted from one of the stations, an ACK packet may be fed back after SIFS amount of time. Then, the remaining stations contend for the next transmission which may occur after a DIFS amount of time. Embodiments contemplate that the data packets could last up to several milliseconds (ms). Embodiments also contemplate that an opportunity for the cellular nodes to access (or "grab") the channel, and in some embodiments perhaps the only opportunity for the cellular nodes to grab the channel, may be when the WiFi stations are contending for the next transmission. One or more embodiments contemplate that it may not be desirable to grab the channel before an ACK packet is fed back because this may cause the data packet to be lost. In such scenarios, fixed-time sensing may have a lower probability of finding the channel idle. However, in a lightly or moderately loaded WiFi network, the channel may stay idle between consecutive transmissions as illustrated in part b of FIG. 6—and thus embodiments contemplate that fixed-time sensing may find the channel idle with a higher probability.

Embodiments contemplate one or more different channel access mechanisms in which the duration of sensing may not be fixed. In one or more embodiments, a transmitter may start sensing the channel at a specific time instance (which may be called an "access opportunity" as described previously) and may continue performing the sensing operation until the channel becomes idle, for example. Embodiments contemplate that a maximum sensing duration limit may be defined so that the transmitter may terminate sensing if the channel does not become available in this duration.

Figure 7:
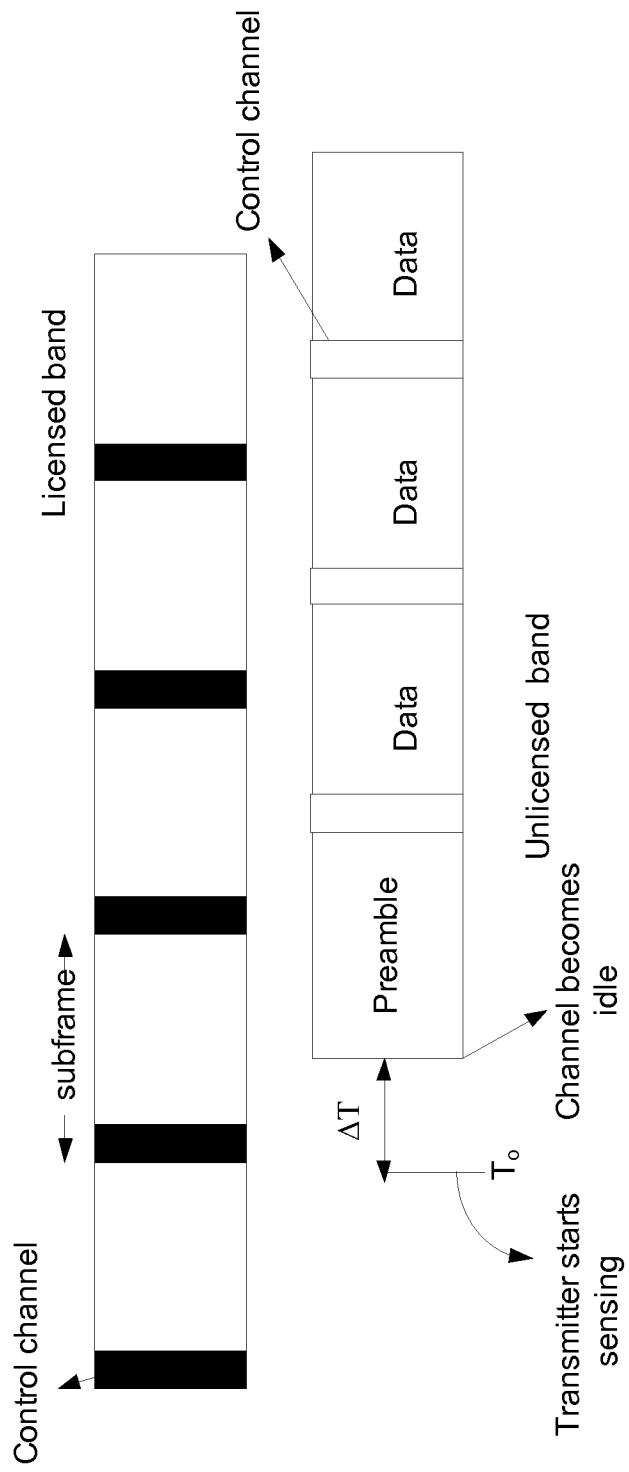
FIG. 7 is a band spectrum showing exemplary bands consistent with embodiments.

Embodiments contemplate that the time instances when sensing may start may be specified semi-statically and/or signaled in the control channel as in the fixed-time sensing, for example. This scheme is illustrated in FIG. 7. In FIG. 7, the transmitter may start sensing the channel at time $T_o$ and may find the channel idle after $\Delta T$ seconds. If the channel does not become available after $\Delta T_{max}$ seconds (not shown), then the transmitter may cease sensing and may resume sensing at the next access opportunity, for example. In one or more embodiments, the frame structure and control channel may be similar to the fixed-time sensing embodiments.

Embodiments contemplate that one or more control channels may be transmitted in the licensed band as described previously. Embodiments further contemplate that the PHY layer of the transmitter may receive a request from the MAC and/or higher layers to sense the unlicensed band for a possible transmission. An access opportunity may be chosen and sensing may be performed. A timer may be started where the value of the timer may be set to the configured maximum sensing duration and the transmitter may start sensing the channel. Embodiments also contemplate that if the timer expires and a channel may be busy, the transmitter may wait for the next access opportunity. Embodiments also contemplate that if the channel is found to be idle before the timer expires, the transmitter may start transmitting padding bits in the idle channel to keep the channel busy. The padding bits may include random data. Embodiments further contemplate that in a subsequently available control channel in the licensed band, and in one or more embodiments perhaps the next available control channel in the licensed band, the transmitter may send the necessary allocation information to the scheduled WTRUs for reception in the unlicensed band. The corresponding data in the scheduled resources may be transmitted in the unlicensed band, for example.

Embodiments further contemplate one or more embodiments for one or more receiving nodes in which one or more receiving nodes may receive and may decode the control channel in the licensed band. Embodiments further contemplate that if resources are scheduled in the unlicensed band, the receiving nodes may start receiving in the unlicensed band and may perform the required receive operations. The corresponding feedback, such as ACK/NACK or channel state/quality information, may be transmitted in the licensed band.

Embodiments further contemplate that one or more control channels may be transmitted in the unlicensed band as described previously. In one or more embodiments the PHY layer of a transmitter may receive a request from the MAC and/or higher layers to sense the unlicensed band for a possible transmission. An access opportunity may be chosen and sensing may be performed. A timer may be started where the value of the timer may be set to a configured maximum sensing duration. And embodiments contemplate that the transmitter may start sensing the channel. Embodiments also contemplate that if the timer expires and the channel is busy, the transmitter may wait for the next access opportunity. Embodiments also contemplate that if the channel is found to be idle before the timer expires, the transmitter may start transmitting a preamble in the idle channel. The preamble may include specific sequence(s) known by the one or more receiving nodes. Embodiments also contemplate that data transmission may start in the unlicensed band. In one or more embodiments, control signaling may be transmitted in the unlicensed band prior to the data. Alternatively or additionally, embodiments also contemplate that control signaling may be transmitted in the licensed band as described previously.

Embodiments also contemplate that—perhaps during an access opportunity—the one or more receiving nodes may start receiving in the unlicensed band and may search for the preamble. A timer may also be started to measure the time spent for searching the preamble. Embodiments also contemplate that if the preamble is not detected and/or the timer expires, then preamble searching may be terminated and/or postponed until the next opportunity, for example. Embodiments also contemplate that if the preamble is detected, synchronization may be achieved. Then, the control channel may be decoded to find out the properties of the incoming transmission in the unlicensed band. The control channel may be transmitted in the unlicensed band prior to the data transmission or in the licensed band. The corresponding feedback, such as ACK/NACK or channel state/quality information may be transmitted in the licensed band, for example.

Embodiments contemplate that—as opposed to the downlink direction where transmission originates from a single node—in the uplink direction several WTRUs may be transmitting to a common receiver. Embodiments contemplate techniques that may resolve the collisions among the transmitting nodes. Embodiments contemplate that in the uplink direction, channel access may include at least two parts: channel sensing that may find an idle channel, and contention resolution among the WTRUSs that may find the channel idle at the same access opportunity.

In one or more embodiments, access opportunities for a group of WTRUs may be non-overlapping in time to ensure that if a WTRU may start transmission, then one or more other WTRUs may keep silent, and in some embodiments perhaps all other WTRUs may keep silent, until the transmission ends due to the sensing capability. One or more embodiments may assume that WTRUs may be in each other's sensing region. In such scenarios, either the fixed-time sensing and/or the variable-time sensing may be used. Access opportunities may be configured by the central controller such as the cognitive relay node semi-statically.

Figure 8:
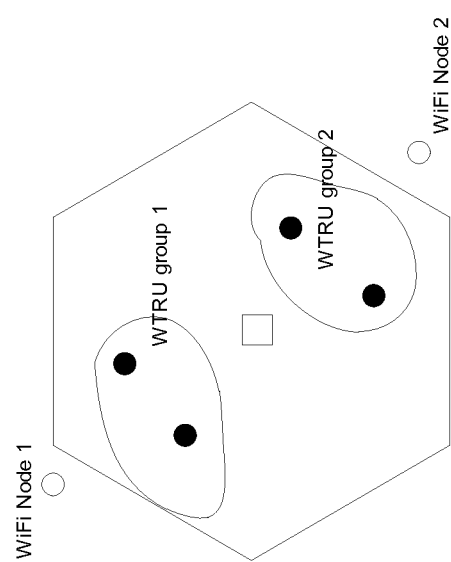
FIG. 8 is a diagram showing WTRU groups and WiFi nodes consistent with embodiments.

Alternatively or additionally, embodiments contemplate one or more access opportunities for a group of WTRUs that may be overlapping in time. In one or more embodiments, several WTRUs may find the channel idle after the performing the sensing operation and may attempt transmission at the same time. If several WTRUs find the channel to be available at the same access opportunity, a contention based access scheme may be applied among the cellular nodes. Embodiments contemplate that one or more WTRUs, and perhaps each WTRU, may start sensing the channel as described in the fixed-time or variable-time sensing embodiments. When the channel becomes available, embodiments contemplate that it may be possible that several WTRUs may find the channel available at the same time. This may occur, for example, when the WTRUs who are sensing the channel are affected by the same outside transmitter which could be a WiFi node or another cellular node, for example. An example is shown in FIG. 8. In FIG. 8, one or more embodiments may assume that the WiFi nodes are outside the sensing regions so they (the WiFi nodes) may transmit simultaneously. The WTRU groups 1 and 2 may start sensing the channel at the same access opportunity. Embodiments contemplate that if WiFi node 1 finishes its transmission earlier, then the WTRUs in group 1 may find the channel idle and start transmission. In such scenarios, when WiFi node 2 may finish the transmission soon, WTRUs in group 2 may find the channel still busy due to the transmissions of the WTRUs in group 1. Embodiments contemplate that channel access attempts of WTRUs in group 2 may be temporarily disabled by the central node for power saving purposes.

Embodiments contemplate that it would be useful to resolve the contention among the WTRUs that attempt transmission in the same access opportunity. In one or more embodiments, contention may occur in the initial transmission and then may be resolved by the receiver. In some embodiments, contention may occur only in the initial transmission and then may be resolved by the receiver. Embodiments contemplate that contention resolution may be achieved by enabling the central node to identify the transmitting WTRUs.

Embodiments contemplate that the WTRU may transmit a special WTRU-specific pre-assigned preamble. The set of preambles may include orthogonal sequences so that the receiver may be able to decode the simultaneous transmissions and may identify the transmitting WTRUs based on, at least in part, the detected preambles. Embodiments contemplate that the once the WTRUs are identified, scheduling grants may be sent to the identified WTRUs in the licensed band and from that point on scheduled transmission may take place.

Embodiments contemplate that from the time when the preamble is transmitted to the time when the grant is received, the WTRUs may continue transmission so that the channel may not be occupied by another node. One or more embodiments are contemplated to manage this transmission. Embodiments contemplate that the transmission resources (e.g., bandwidth and/or time, etc.) may be divided into several non-overlapping parts and this allocation may be configured before transmission takes place in the unlicensed band. A WTRU that finds the channel idle may randomly select one of these non-overlapping resources and may use these resources for data transmission until a grant may be received. In such scenarios, embodiments contemplate that the MAC packet may also carry the WTRU ID so that the receiver may be able to understand from which WTRU the transmission is coming from. Embodiments contemplate that two or more WTRUs may choose the same resource for transmission. In one or more embodiments, the receiver may estimate the channels of these WTRUs reliably to be able to decode the colliding transmissions. Embodiments contemplate that orthogonal reference signals may be used by the WTRUs and that one or more reference signals may be configured for one or more preamble sequences (or equivalently WTRU ID), and perhaps each preamble sequence (or equivalently WTRU ID).

Alternatively or additionally, embodiments contemplate that—instead of or in addition to transmitting data after the preamble transmission and/or until a grant is received, the WTRU may do one or more of the following:

The WTRU may transmit padding bits to keep the channel busy until a grant is received;

The WTRU may repeat the preamble until an uplink grant is received; and/or

The WTRU may get an uplink grant before the actual transmission occurs and this uplink grant may be valid if the WTRU finds the channel available and decides to use it. In some embodiments, this uplink grant may only be valid if the WTRU finds the channel available and decides to use it. In such scenarios, this grant may be valid until a new grant is received.

Embodiments contemplate that the relay node may choose not to assign any resources in the unlicensed band to the WTRUs, for example if it finds that the SINR is not good enough. In such scenarios, the WTRUs may terminate access attempt after a predefined amount of time, or the relay node may send a message to the identified WTRUs to postpone the transmission attempts, for example.

Embodiments contemplate that Time-Division Duplexing (TDD) may be used as a duplexing method for separating transmission and reception in the unlicensed band. Embodiments recognize that when a transmission occurs in a given direction, some kind of feedback may be provided from the receivers. At least some feedback may be acknowledgment and channel state/quality information. When a node attempts to convert from reception to transmission to send feedback to the transmitter, it may not be able to find the channel available, perhaps resulting in a lost transmission opportunity and increased latency. Embodiments contemplate using the licensed channel to send feedback to the transmitting node as described previously. Embodiments further contemplate that a node may be receiving data in the unlicensed band and may simultaneously send feedback to the transmitter in the licensed band. One or more embodiments contemplate using the channel for an amount of time, and in some embodiments perhaps a relatively long amount of time, in a given direction. For example, the channel may be used for tens (10s) of milliseconds for transmission in one direction.

Figure 9:
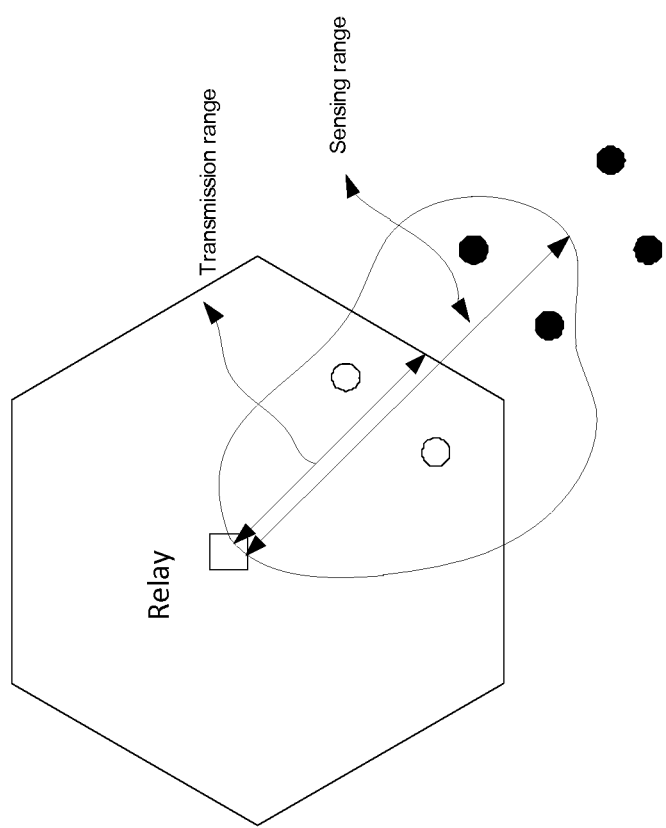
FIG. 9 is a diagram showing exemplary transmission from relay nodes to WTRUs consistent with embodiments.

Alternatively or additionally, embodiments also contemplate converting from reception to transmission in an amount of time, and in some embodiments perhaps a relatively short amount of time, without performing sensing and starting transmission so that one or more nodes in the vicinity will not find the channel idle and attempt to use. In such scenarios, incumbent nodes in the vicinity of the receiver and that are capable of sensing the transmitter may not be affected when the receiver converts to transmission. Referring to the exemplary illustration of FIG. 9, one or more embodiments may assume the relay node is transmitting to the WTRUs denoted with white (empty) circles. The WiFi nodes—shown as dark (filled) circles—in the sensing region of the relay may keep quiet during this transmission. Embodiments contemplate that if the WTRUs convert to transmission mode and start transmission, these WiFi nodes may still keep quiet because they may be in the sensing region of the WTRUs as well. Embodiments contemplate that another WiFi node outside the sensing region may be transmitting at the time a WTRU starts transmission which may result in a collision of the WTRU packet with the WiFi packet. Embodiments contemplate that the throughput of the one or more WiFi nodes may not degrade significantly due to these collisions if the cellular node does not convert from transmission to reception, and in some embodiments perhaps does not convert from transmission to reception relatively frequently.

Embodiments contemplate that if a cellular node initiates transmission without sensing, it may cause a collision with an ongoing WiFi transmission. In one or more embodiments—after the WiFi packet transmission ends—WiFi nodes may sense the channel to be busy and may not transmit until the cellular node stops its transmission. Also, embodiments contemplate that if the cellular node initiates transmissions without sensing, or perhaps very frequent transmissions without sensing, the throughput of the incumbent system may degrade significantly due to the number of possible collisions, which may be potentially large. On the other hand, if the channel is used for a time after a transmission is initiated, and perhaps a reasonably long time after a transmission is initiated, the throughput of the incumbent system may degrade slightly because perhaps one packet may be lost over a long interval, for example.

Embodiments contemplate one or more channel access schemes in which a transmitter may or may not perform sensing of the channel, and may start transmission if the channel is idle. The channel may be used for x seconds. Embodiments also contemplate that after x seconds, the receiver may convert from reception to transmission mode and may start transmission to the transmitter. The transmitter may or may not perform sensing, but in one or more embodiments the turnaround time may be short. Embodiments also contemplate that the maximum turnaround time may be smaller than SIFS, for example. In one or more embodiments, the channel may be used for y seconds. Embodiments contemplate that after y seconds, the transmitter may convert from reception to transmission mode and may start transmission. The transmitter may or may not perform sensing, but in one or more embodiments the turnaround time may be short. Further, embodiments contemplate that the maximum turnaround time may be smaller than SIFS, for example. Embodiments contemplate that the channel may again be used for a predefined amount of time. In one or more embodiments, this cycle may continue for a predefined amount of time. Embodiments also contemplate that one or more nodes, and in some embodiments perhaps all nodes, may keep quiet until a new cycle of transmission starts. In one or more embodiments, the previously described transmission durations (x, y, and any other predefined duration) may be relatively large as compared to the maximum packet length of the incumbent system, for example.

Embodiments contemplate that the duration of the sensing may be a consideration in maximizing the probability that LTE nodes may successfully access the unlicensed spectrum, while perhaps avoiding interrupting ongoing transmissions in incumbent systems. Considering the prevalent WiFi networks, WiFi networks may be treated as perhaps the most numerous incumbent systems in one or more embodiments. The 802.11 standards define different waiting time, SIFS, PIFS, DIFS, etc., for nodes to access the channel. Embodiments recognize that the relationship between these three durations may be: Short Interframe Space (SIFS)<Point Coordination Function (PCF) Interframe Space (PIFS)<Distributed Coordination Function (DCF) Interframe Space (DIFS). WiFi nodes may determine that the channel is idle for DIFS duration before launching any transmissions. WiFi nodes may wait for an idle period of SIFS time between DATA frames and ACK frames. Embodiments recognize that PIFS may be used in a point coordination function (PCF) of 802.11. Though specified in 802.11 standards, embodiments recognize that PCF is not adopted by WiFi alliance and thus may not be implemented in current WiFi nodes. As a result, few if any WiFi devices may use PIFS in channel access.

Figure 10:
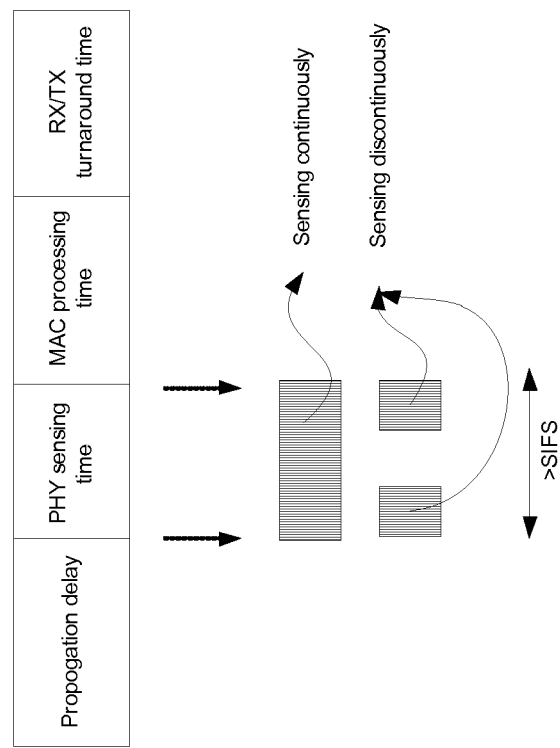
FIG. 10 is an exemplary timing diagram consistent with embodiments.

Embodiments contemplate that LTE nodes may sense the spectrum for PIFS duration, which may ensure that the LTE nodes may not interrupt ongoing WiFi transmissions, while helping to establish that LTE may have higher priority in accessing the channel than WiFi nodes. When LTE and WiFi nodes may start sensing the channel at the same time, LTE nodes may start transmission in PIFS time, which may cause the channel to be busy and thus WiFi nodes may defer their transmissions. Embodiments contemplate that sensing duration may refer to the total time spent for the sensing of the channel by the PHY layer, propagation delay, MAC processing delay, RX/TX turnaround time, and/or other operations. Embodiments contemplate that if the physical sensing is continuous, the duration may be larger than SIFS and may be smaller than DIFS. If the physical sensing is discontinuous, then the duration from the starting of the first sensing period to the end of the last sensing period may be larger than SIFS and smaller than DIFS. This may help ensure that the channel is not accessed in the time after a data packet may be transmitted by a WiFi node and when an ACK packet may be expected. An exemplary timing is illustrated in FIG. 10. An acknowledgement (ACK) packet may be transmitted by the WiFi device after a data packet is received. In one or more embodiments, the interval between the data packet being received and the ACK is transmitted may be equal to the SIFS.

The channel utilization rate (e.g., a percentage of time the channel may be busy) of incumbent non-LTE systems may be a factor in LTE node access in the unlicensed spectrum. Embodiments contemplate that LTE systems may adjust its spectrum usage according to the channel utilization rate of incumbent non-LTE systems, perhaps in order to ensure high performance for LTE and perhaps avoid severely degrading the performance of non-LTE systems. Embodiments recognize that the channel utilization rate of incumbent non-LTE systems may be different at different locations, and thus different values, and perhaps significant values, may be observed by different WTRUs. In addition, there may be a limited number of unlicensed spectrum channels that LTE systems can access. Embodiments further recognize that the channel utilization rate of incumbent non-LTE systems in each channel may be different. Embodiments contemplate that it may be useful to collect the channel utilization rate of incumbent non-LTE systems observed by one or more WTRUs, and perhaps each WTRU, as part of its measurements and coordinate the transmissions from and to the WTRUs based on the collected data.

Embodiments contemplate one or more techniques for transmissions in LTE cellular networks with infrastructure relays. In one or more embodiments, the relay may monitor the transmission queue length (or buffer status report) of each WTRU, based on which it may determine whether the backlog for a WTRU may be too much and thus extra bandwidth in the unlicensed spectrum may be needed for this WTRU. This information can also be used to determine load on an unlicensed band. If extra bandwidth is needed, the relay may then determine the desired usage in the unlicensed spectrum. Embodiments also contemplate that the relay may send a channel sensing request to some or all WTRUs that may need extra bandwidth in the unlicensed spectrum. One or more embodiments recognize that if the relay has historical data collected for a WTRU, and/or the WTRU may not be moving fast, the relay can make use of the historical data and channel sensing for this WTRU. This may reduce channel sensing time.

Embodiments contemplate that upon reception of a channel sensing request, a WTRU may sense the channel for a pre-defined sensing period (which for example may be in the order 10 ms or 100 ms), in order to obtain the channel utilization rate of the incumbent non-LTE systems in several channels of the unlicensed spectrum. The WTRU may then report to the relay K channels that may be associated with the lowest channel utilization rate of incumbent non-LTE systems. Embodiments recognize that a WTRU can make use of historical sensing results to estimate which channels are mostly likely to be in low usage, and sense those channels first, for example. This may reduce channel sensing time. In addition to the WTRUs, relays and other cellular nodes that may intend to operate in the unlicensed spectrum may also perform similar measurements.

Embodiments also contemplate that a relay may assign different channel access attempt slots to different WTRUs, according to their respective desired usage in the unlicensed spectrum and/or the channel utilization rate of the incumbent non-LTE systems in different channels. More specifically, one or more embodiments contemplate that different WTRUs may be assigned to different channels, and in some embodiments may be assigned to different channels whenever possible. Embodiments also contemplate that if assigned to the same channels, different WTRUs may attempt to access the channel at different time slots, so that there may be fewer, if any, collisions and in some embodiments perhaps no collisions. Embodiments contemplate that should a channel utilization rate of one or more incumbent non-LTE systems in the channel assigned to a WTRU be x percent, then the usage of the WTRU in the unlicensed spectrum may be less than (100−x) percent in order not to reduce the data rate of the incumbent system, for example. Embodiments also contemplate that WTRUs that may require higher usage in the unlicensed spectrum may be assigned more attempt slots for a given time period.

Figure 11:
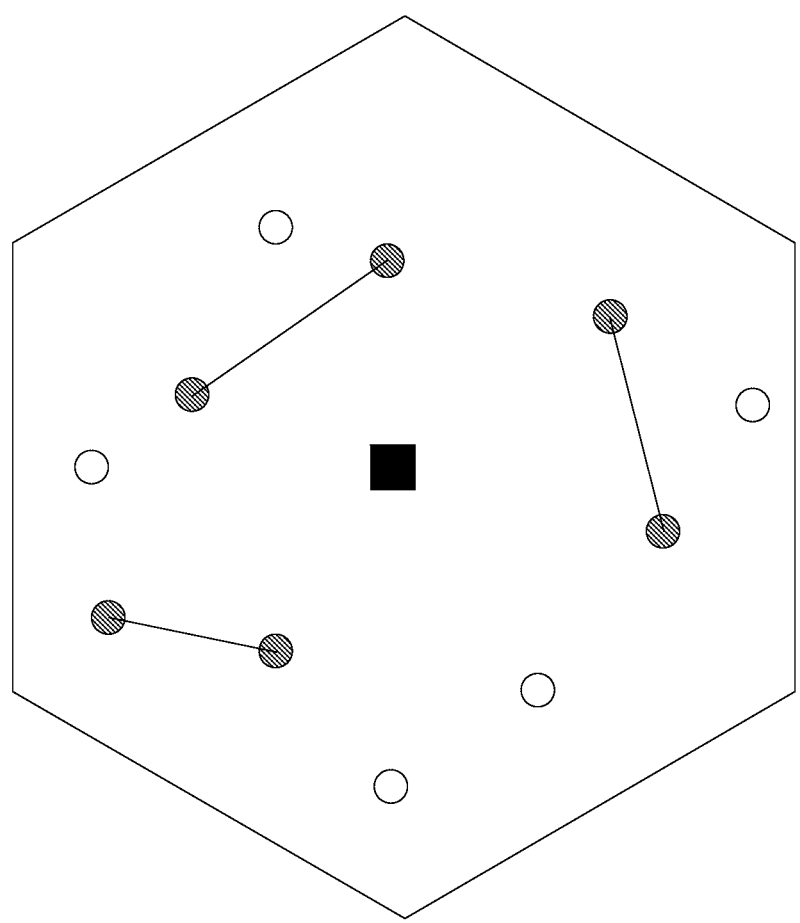
FIG. 11 is a diagram showing cellular nodes communicating with each other, a central controller, and incumbent nodes consistent with embodiments.

One or more contemplated embodiments may resolve collisions when there may be independent links of unlicensed usage among several nodes in close proximity. As illustrated in FIG. 11 where the cellular nodes communicating with each other (for example as in client communications networks) are indicated by the clear (empty) circles, the central controller is indicated as a black (filled) box, and the incumbent nodes are indicated as dark (filled) circles.

Embodiments contemplate that sensing the activity of non-cellular nodes before accessing a channel in the unlicensed spectrum may minimize the disruption on the incumbent communications. Because incumbent nodes, such as local area network nodes, may start and end their transmissions dynamically, measurements related to this activity may not be shared very promptly. Embodiments contemplate that long term statistics about channel activity may be measured and fed back to the central controller for processing. One or more embodiments contemplate that nodes may measure the level of interference due to non-cellular nodes and perhaps the statistics about the interference, for example how often it occurs, maximum interference level, etc. These measurements may carry information about whether there are incumbent networks in the vicinity, the activity level of these networks if any, and/or the expected interference from these networks. Embodiments contemplate that, based at least in part on these measurements, the central controller may configure certain channel access parameters and/or interference control/avoidance parameters such as maximum transmit power, which channels of the unlicensed band to use, among others, for example.

Embodiments contemplate that, depending at least in part on the measurements, the network may configure the usage of the unlicensed band semi-statically. One or more embodiments contemplate that if the activity level or interference in one channel of the unlicensed band may be too large and/or there may not enough idle channel opportunities, the network may stop using that channel until the conditions improve, or start using the channel at all times (perhaps without sensing) but with a modulation and coding scheme (MCS), and in one or more embodiments perhaps a conservative MCS. Embodiments contemplate that a conservative MCS may include that a lower modulation order and higher coding rate may be used, which may result in a lower data rate. In such scenarios, the channel may be treated as a regular component carrier with low SINR.

Embodiments recognize that the Federal Communications Commission (FCC) originally conceived the license-exempt bands to provide a no-cost portion of public access spectrum with two provisions. First, the transmitter could cause no harmful interference to any nearby licensed services, and secondly, any receiver in this band must be able to accept any interference that may be present.

FCC regulations require that transmitters in unlicensed band may not cause harmful interference to others. Embodiments recognize that it is also potentially injurious to incumbent unlicensed band users (e.g., WiFi) if an LTE system may be too demanding in accessing unlicensed band. Therefore, the impact to incumbent unlicensed band users may be examined when an LTE system accesses the unlicensed band. In one or more embodiments, it may be assumed that an LTE system co-exists with an 802.11g WLAN in the same band. The impact of the LTE channel access fixed-time sensing embodiments, continuous sensing embodiments, and no sensing are examined. Also, for the purpose of comparison, a scheme where LTE node accesses the channel exactly like WiFi nodes is examined. For purpose of exemplary illustration, there are ten WiFi users in the WLAN. Under such setup, simulations results for co-existed LTE/WiFi networks have been obtained.

In simulations for reference access schemes that may be like WiFi, the performance of the contemplate embodiments is compared with that of a WiFi access scheme. Stated somewhat differently, scenarios in which LTE nodes may access the unlicensed spectrum in much the same fashion as WiFi does, and perhaps exactly as WiFi does, and such performance is compared with that of the contemplated embodiments.

Figure 12:
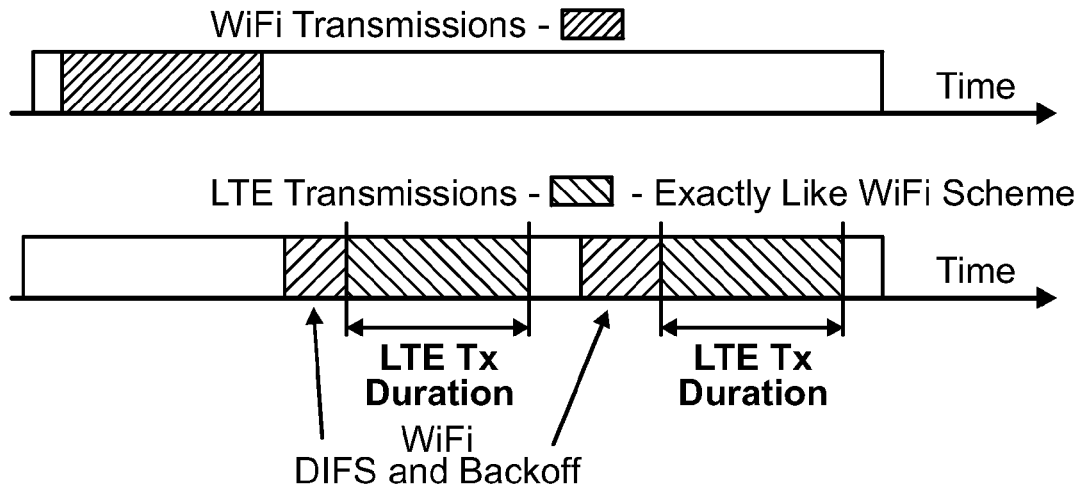
FIG. 12 are exemplary timing diagrams showing the behavior of LTE nodes consistent with embodiments.
Figure 13:
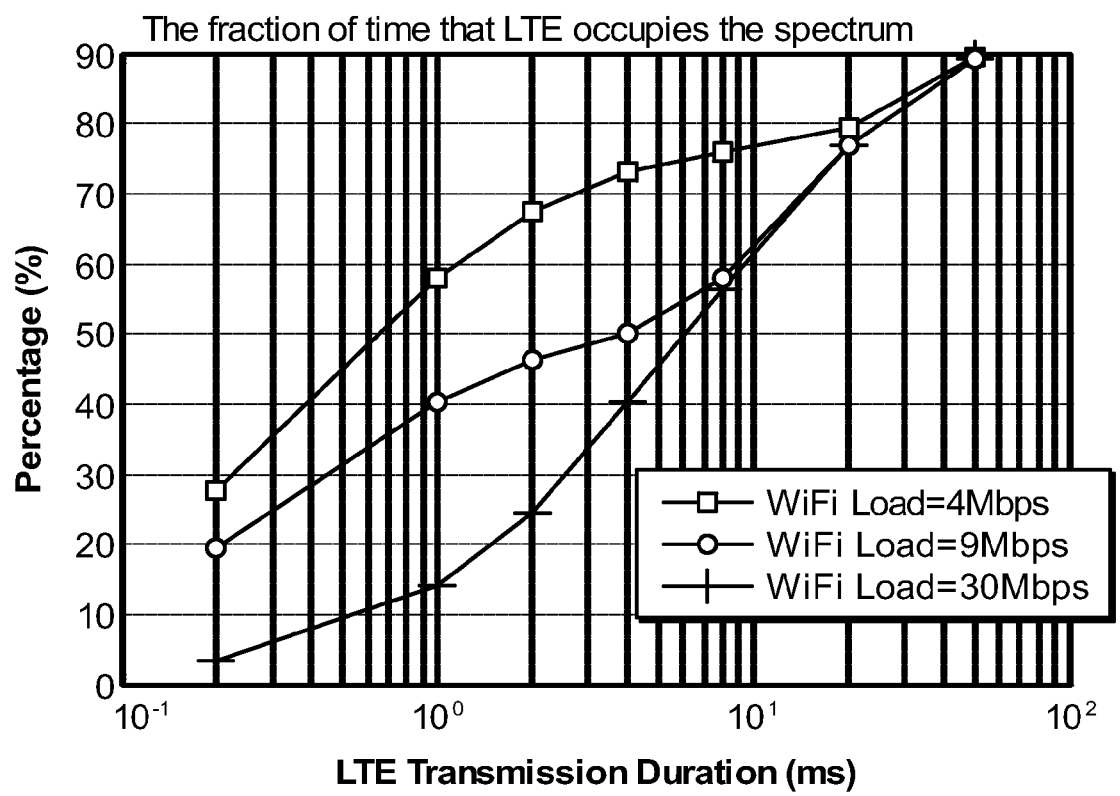
FIG. 13 is a graph showing exemplary LTE transmission duration versus percentage consistent with embodiments.

As shown in FIG. 12, one or more contemplated embodiments may assume that LTE nodes may be exactly like WiFi nodes. For example, LTE nodes may understand WiFi packets, set NAV, wait for DIFS before transmissions, do backoff, etc. By adjusting LTE transmission duration, LTE system can get different fraction of time that LTE system occupies the unlicensed spectrum, as shown in the example of FIG. 13.

Figure 14:
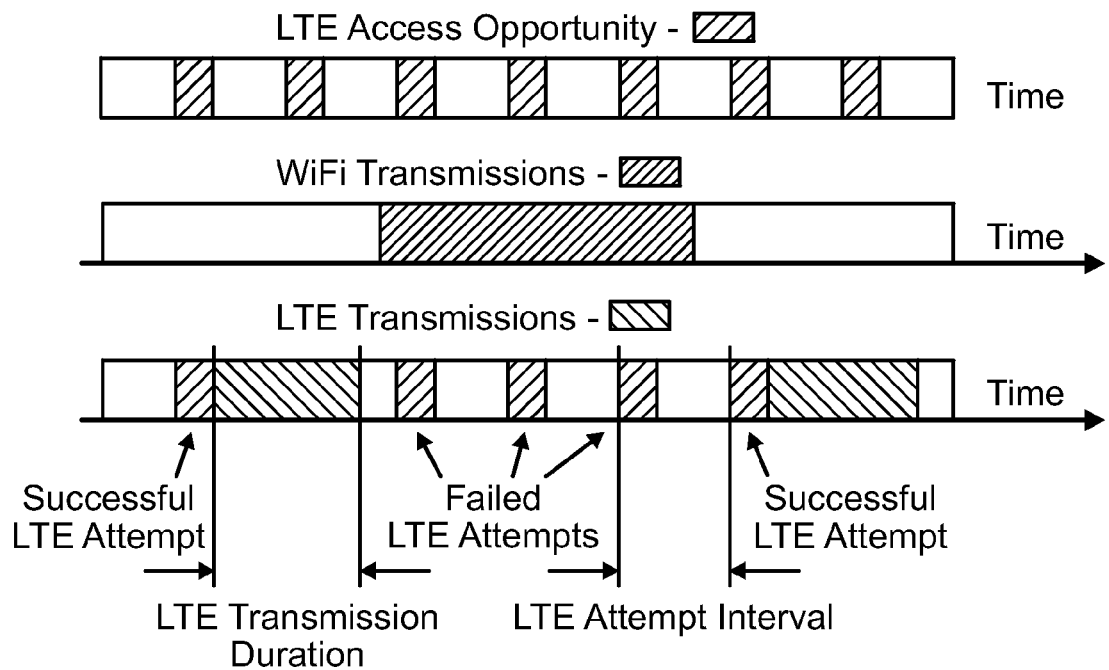
FIG. 14 are exemplary timing diagrams consistent with embodiments.
Figure 15:
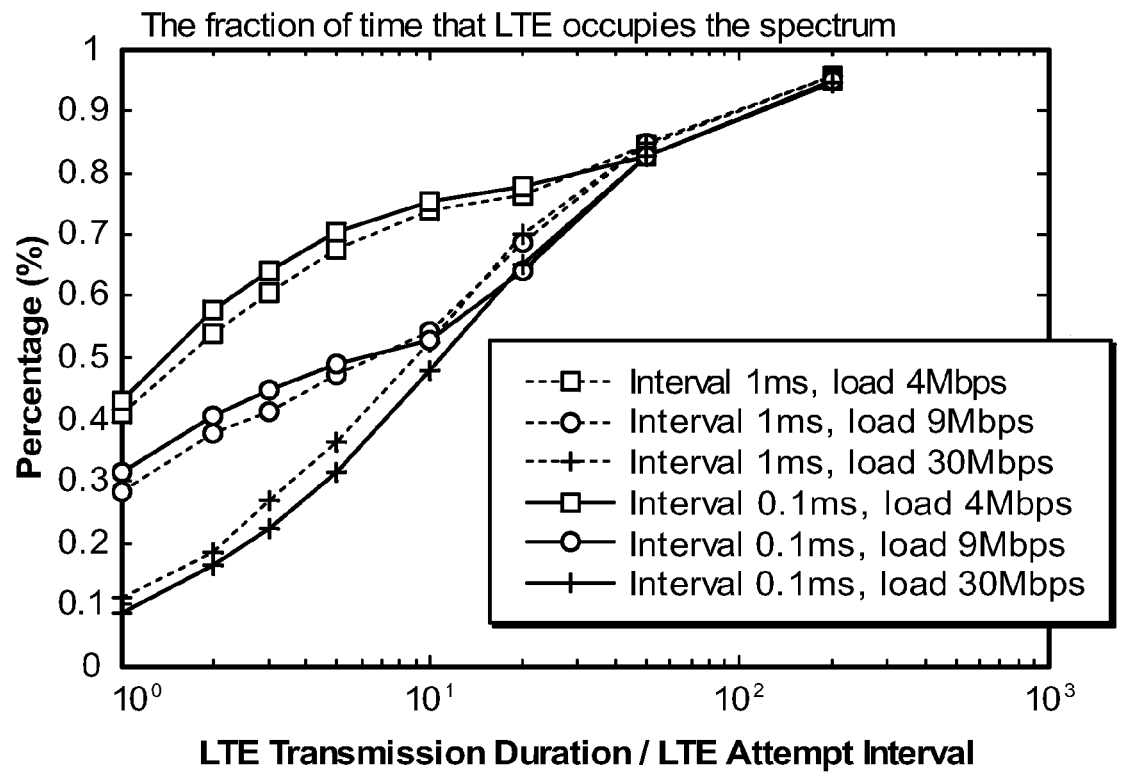
FIG. 15 is a graph showing exemplary LTE transmission duration/LTE attempt interval versus percentage consistent with embodiments.

As described previously, one or more embodiments contemplate LTE access schemes that may employ fixed-time sensing. As shown in FIG. 14, there are at least two useful parameters in the contemplated fixed-time sensing schemes—LTE transmission duration and LTE attempt interval. By adjusting these two parameters, LTE systems can get a different fraction of time that an LTE system may occupy the unlicensed spectrum, as shown in FIG. 15.

Figure 16:
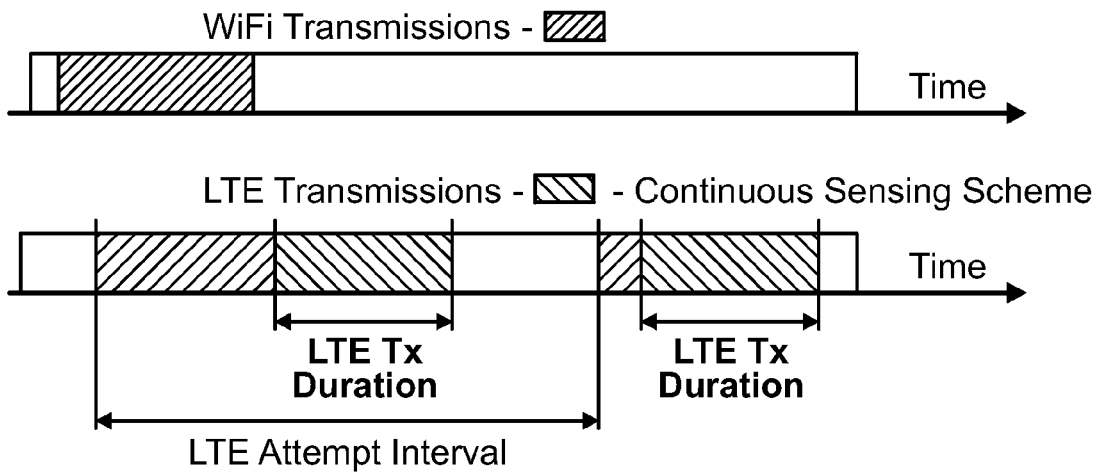
FIG. 16 are exemplary timing diagrams consistent with embodiments.
Figure 17:
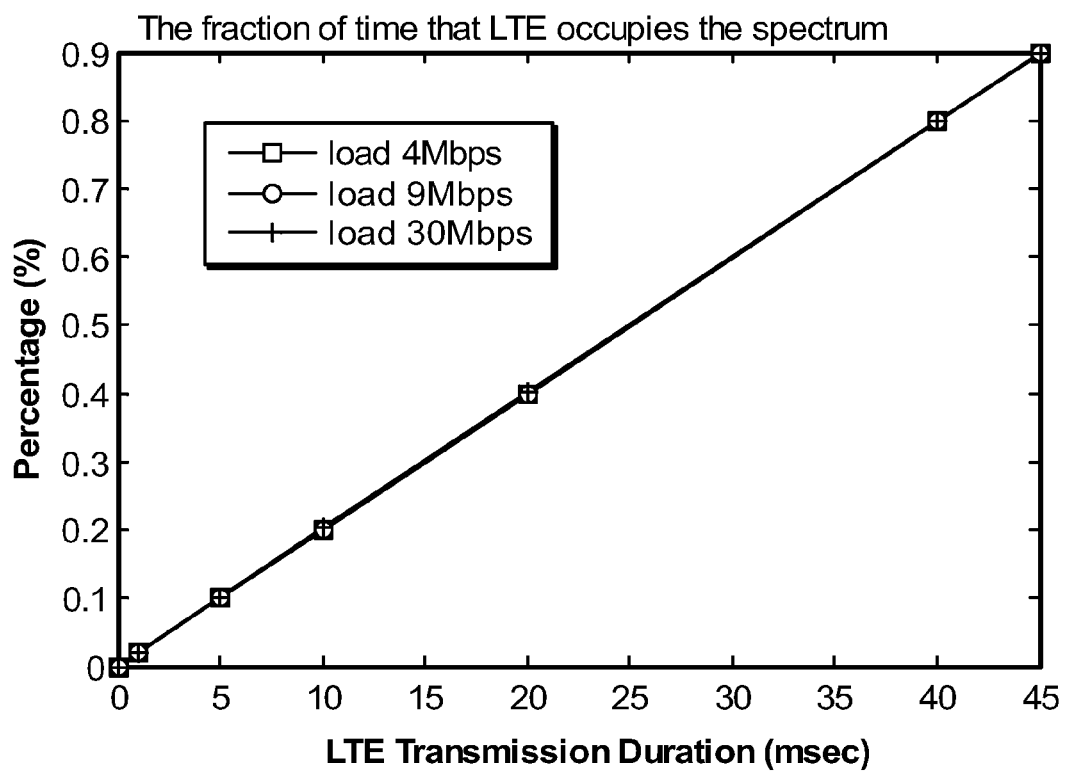
FIG. 17 is a graph showing exemplary LTE transmission duration versus percentage consistent with embodiments.

As described previously, one or more embodiments contemplate LTE access schemes that may employ variable-time (or continuous) sensing. As shown in FIG. 16, there are at least two useful parameters in the contemplated continuous sensing schemes—LTE transmission duration and LTE attempt interval. By adjusting these two parameters, LTE systems can get a different fraction of time that an LTE system may occupy the unlicensed spectrum, as shown in FIG. 17. In FIG. 17, the LTE attempt interval is set to 50 ms; for other LTE attempt intervals, very similar results are observed (but not shown).

Figure 18:
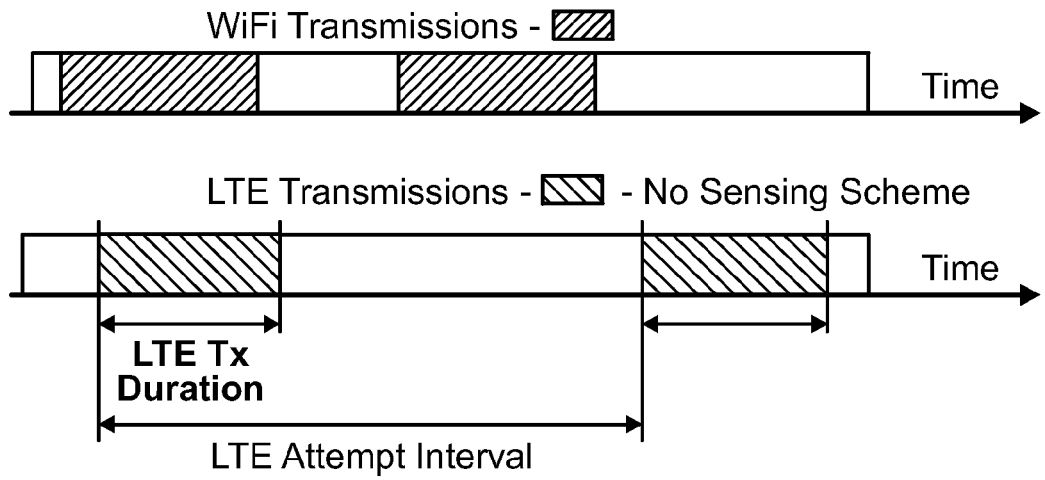
FIG. 18 are exemplary timing diagrams consistent with embodiments.
Figure 19:
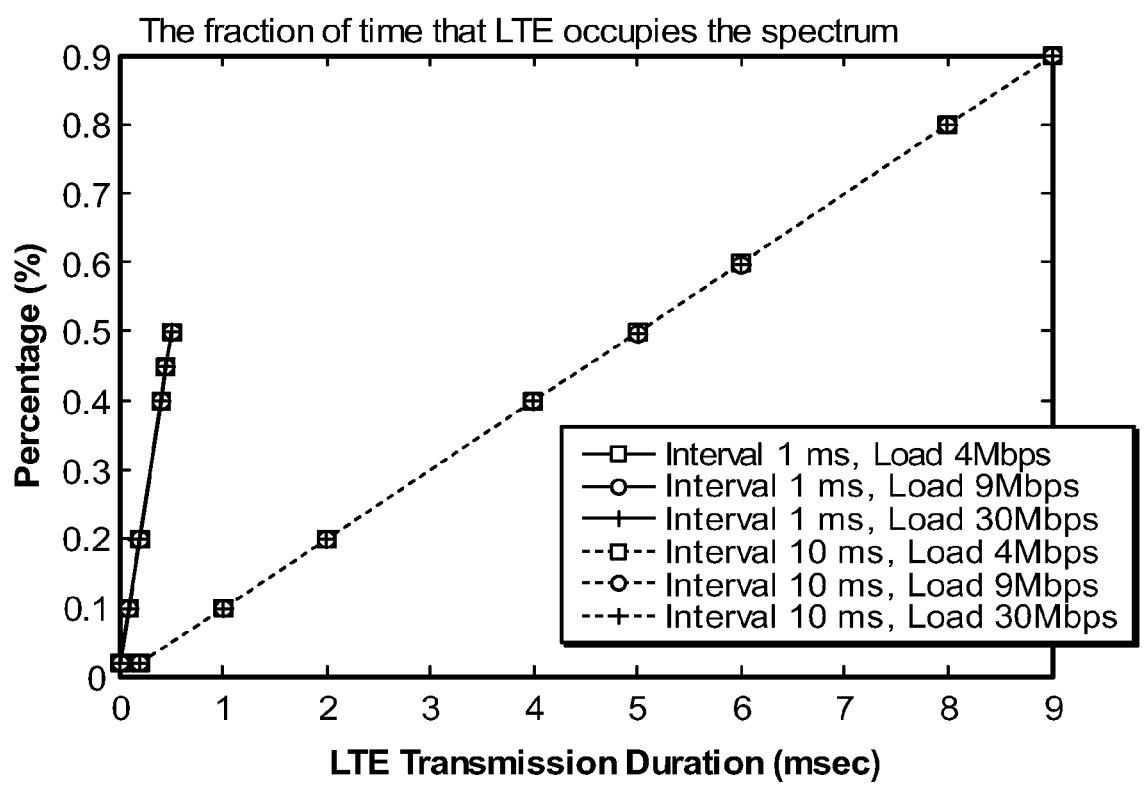
FIG. 19 is a graph showing LTE transmission duration versus percentage consistent with embodiments.

As described previously, one or more embodiments contemplate LTE access schemes in which no sensing may be performed. As shown in FIG. 18, there are two important parameters in the proposed "no sensing" schemes—LTE transmission duration and LTE attempt interval. By adjusting these two parameters, LTE system can get different fraction of time that LTE system occupies the unlicensed spectrum as shown in FIG. 18. In FIG. 18, embodiments contemplate that the transmitter may start transmission and then may wait for a specific amount of time, perhaps a predetermined amount of time, until starting again. One or more such embodiments may be referred to as on/off schemes.

Embodiments contemplate that by adjusting LTE transmission duration, LTE systems may also manage the interference level (SIR) in the presence of LTE/WiFi collisions. The maximum transmission time in WiFi systems may be fixed and may be determined by the lowest WiFi transmission rate and maximum packet length. If LTE transmission time is longer than WiFi maximum transmission time, LTE/WiFi collisions may occur, and in some embodiments may only occur, in the front portion of an LTE transmission, but may not occur in the other portions of an LTE transmission. This is because if WiFi transmission duration may be shorter than an LTE transmission duration, some or all WiFi nodes may find the channel busy after the WiFi transmission ends, so few if any WiFi nodes may start a new transmissions duration the rest LTE transmission time. Therefore, a longer transmission time may be preferable for an LTE node, since a smaller portion of LTE transmissions may be at the risk of collisions.

Figure 20A:
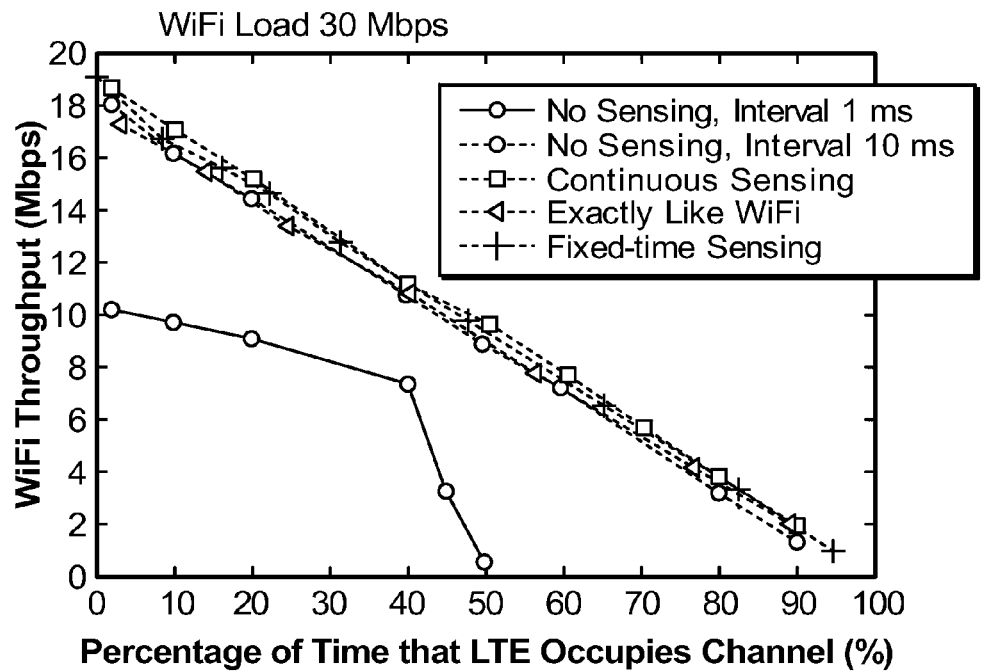
FIG. 20A is a graph showing exemplary WiFi throughput (heavy WiFi network load, load 30 Mbps) consistent with embodiments.
Figure 20B:
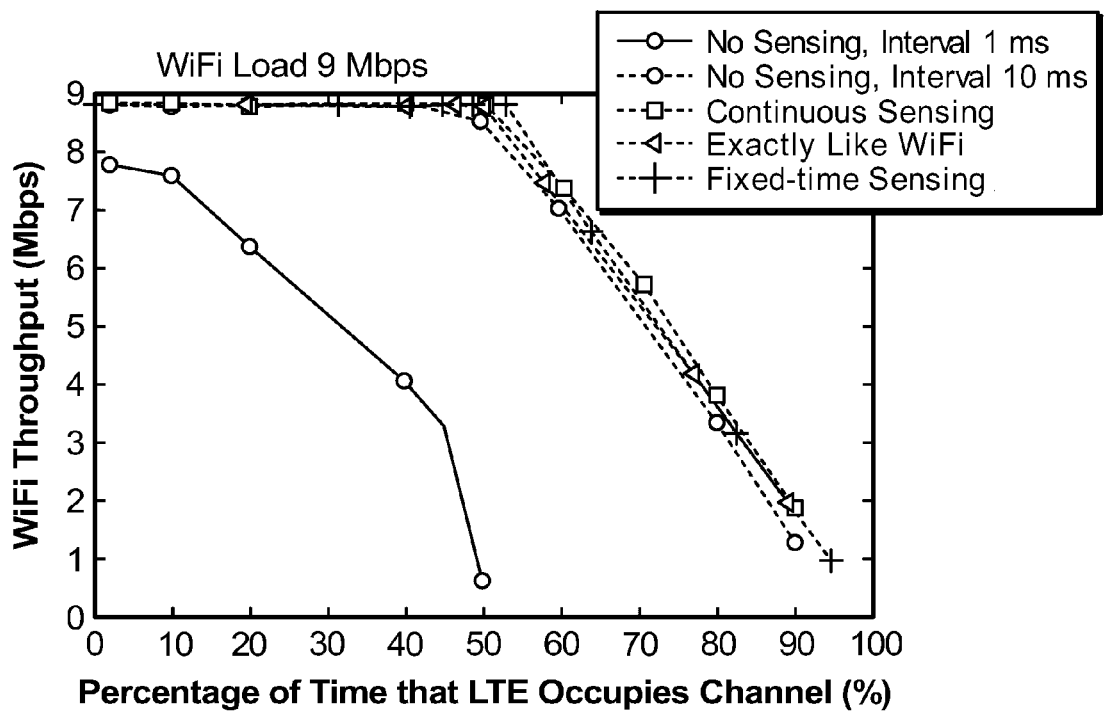
FIG. 20B is a graph showing exemplary WiFi throughput (median WiFi network load, load 9 Mbps) consistent with embodiments.
Figure 20C:
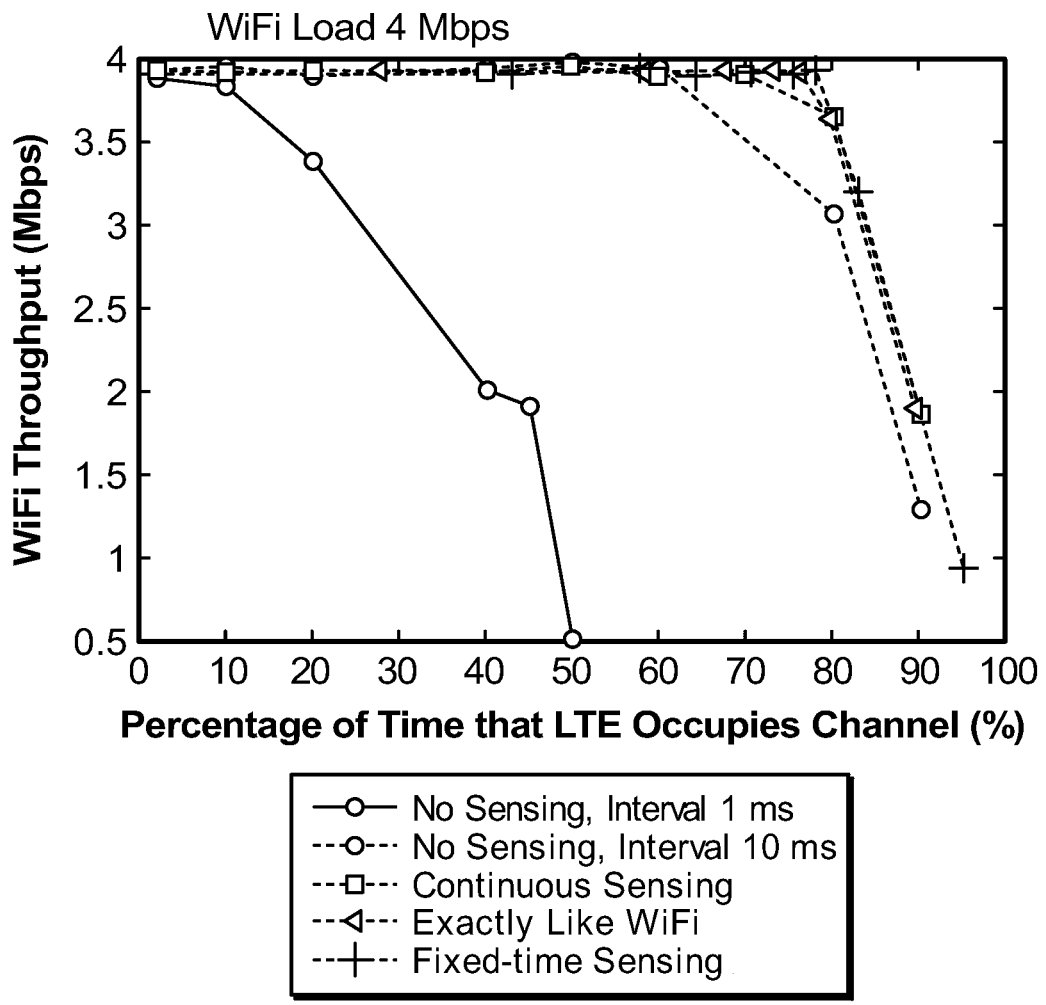
FIG. 20C is a graph showing exemplary WiFi throughput (light WiFi network load, load 4 Mbps) consistent with embodiments.

From simulation results illustrated in FIG. 20A, FIG. 20B, and FIG. 20C, it may be observed that when WiFi load is heavy, WiFi throughput may, and in some instances may always, drop if LTE system uses the same unlicensed spectrum. In the case of median WiFi load, the LTE system can occupy the spectrum for up to about 50% of the time, for example, without degrading WiFi performance. In the case of light WiFi load, the LTE system can occupy the spectrum for up to about 80% of the time, for example, without degrading WiFi performance. Therefore, embodiments contemplate that an LTE system may find (or determine) the fraction of time that the unlicensed spectrum is occupied by non-LTE devices. If the channel is used for x percent of the time by incumbent systems, then LTE can, and in some instances can at most, use the channel for (100-x) percent of the time without degrading WiFi throughput, for example. This also suggests that the fraction of channel time occupied by the incumbent systems may be a useful parameter in LTE channel access schemes for unlicensed spectrum for one or more of the contemplated embodiments.

Figure 21:
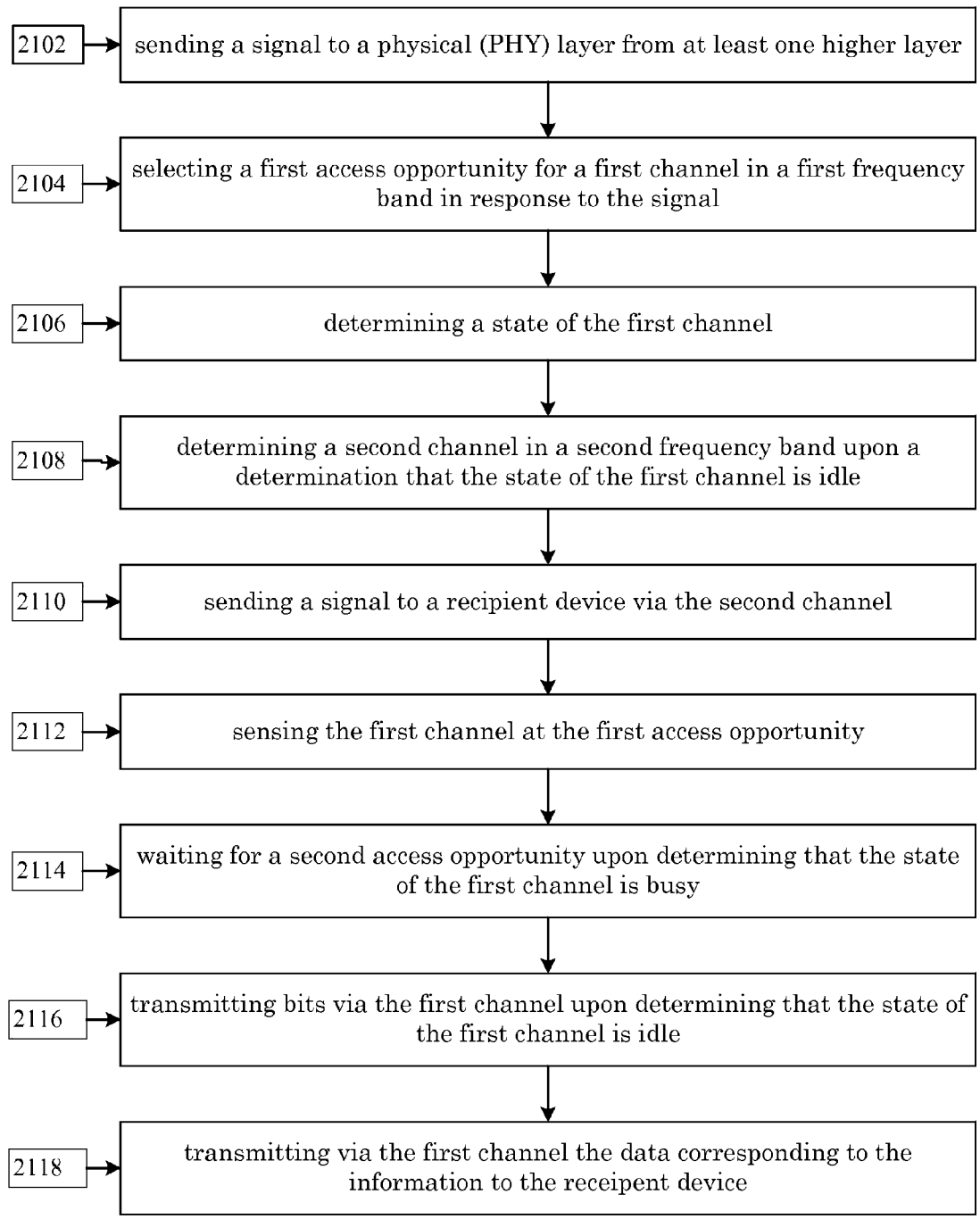
FIG. 21 illustrates an exemplary configuration scheme consistent with embodiments.

In view of the embodiments described herein, and referring to FIG. 21, embodiments contemplate a wireless transmit/receive (WTRU) device that may be configured, at least in part, to establish communication. The WTRU configuration may comprise, at 2102, sending a signal to a physical (PHY) layer from at least one higher layer, and at 2104, selecting a first access opportunity for a first channel in a first frequency band in response to the signal. Embodiments also contemplate at 2106, the WTRU configuration may include determining a state of the first channel, and at 2108, may include determining a second channel in a second frequency band upon a determination that the state of the first channel is idle. At 2110, the WTRU configuration may include sending a signal to a recipient device via the second channel. Embodiments contemplate that the signal may include information for reception via the first channel of data corresponding to the information.

Embodiments contemplate that the first frequency band may be at least one of an unlicensed band or a lightly-licensed band, and that the second frequency band may be a licensed band, for example. Embodiments also contemplate that the at least one higher layer may be a medium access control (MAC) layer. Also, embodiments contemplate that the determining the state of the first channel may further include, at 2112, sensing the first channel at the first access opportunity. Embodiments contemplate, at 2114, that the configuration may further comprise waiting for a second access opportunity upon determining that the state of the first channel is busy. Embodiments contemplate that the second access opportunity may be separated in time from the first opportunity by an integer multiple of a fixed interval.

Embodiments further contemplate that, at 2116, the configuration of the WTRU may further comprise transmitting bits via the first channel upon determining that the state of the first channel is idle. Embodiments contemplate that the transmitted bits may include at least one of random bits or a preamble that may be known to the recipient device. Embodiments contemplate that, at 2118, the WTRU configuration may further comprise transmitting via the first channel the data corresponding to the information to the recipient device. Also, embodiments contemplate that the second channel may be a control channel.

Figure 21A:
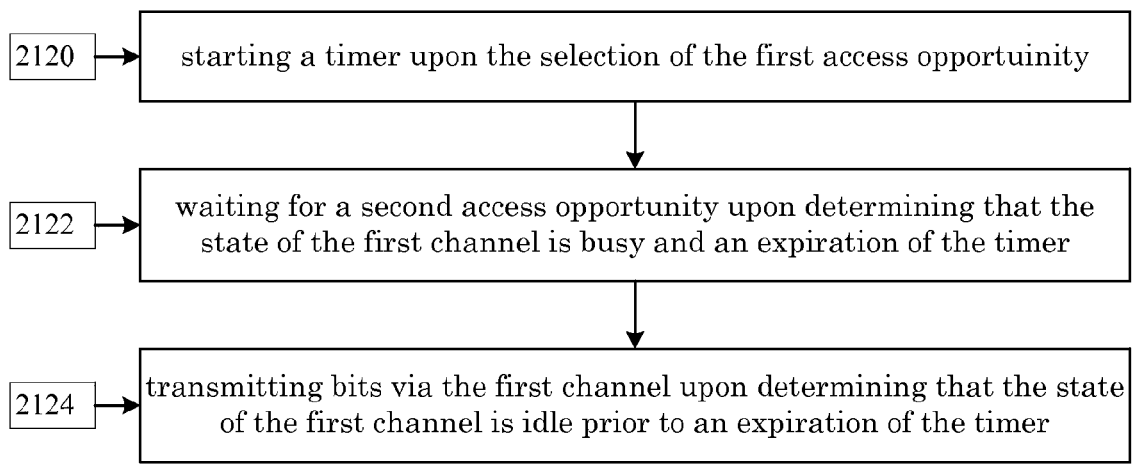
FIG. 21A illustrates an exemplary configuration scheme consistent with embodiments.

Alternatively or additionally, and referring to FIG. 21A, embodiments contemplate, at 2120 that the configuration may further comprise starting a timer upon the selection of the first access opportunity. Embodiments contemplate, at 2122, that the WTRU configuration may further comprise waiting for a second access opportunity upon determining that the state of the first channel is busy and an expiration of the timer. Embodiments also contemplate, at 2124, the WTRU configuration may further include transmitting bits via the first channel upon determining that the state of the first channel is idle prior to an expiration of the timer. Embodiments contemplate that the transmitted bits may include at least one of random bits or a preamble known to the recipient device, for example.

Figure 22:
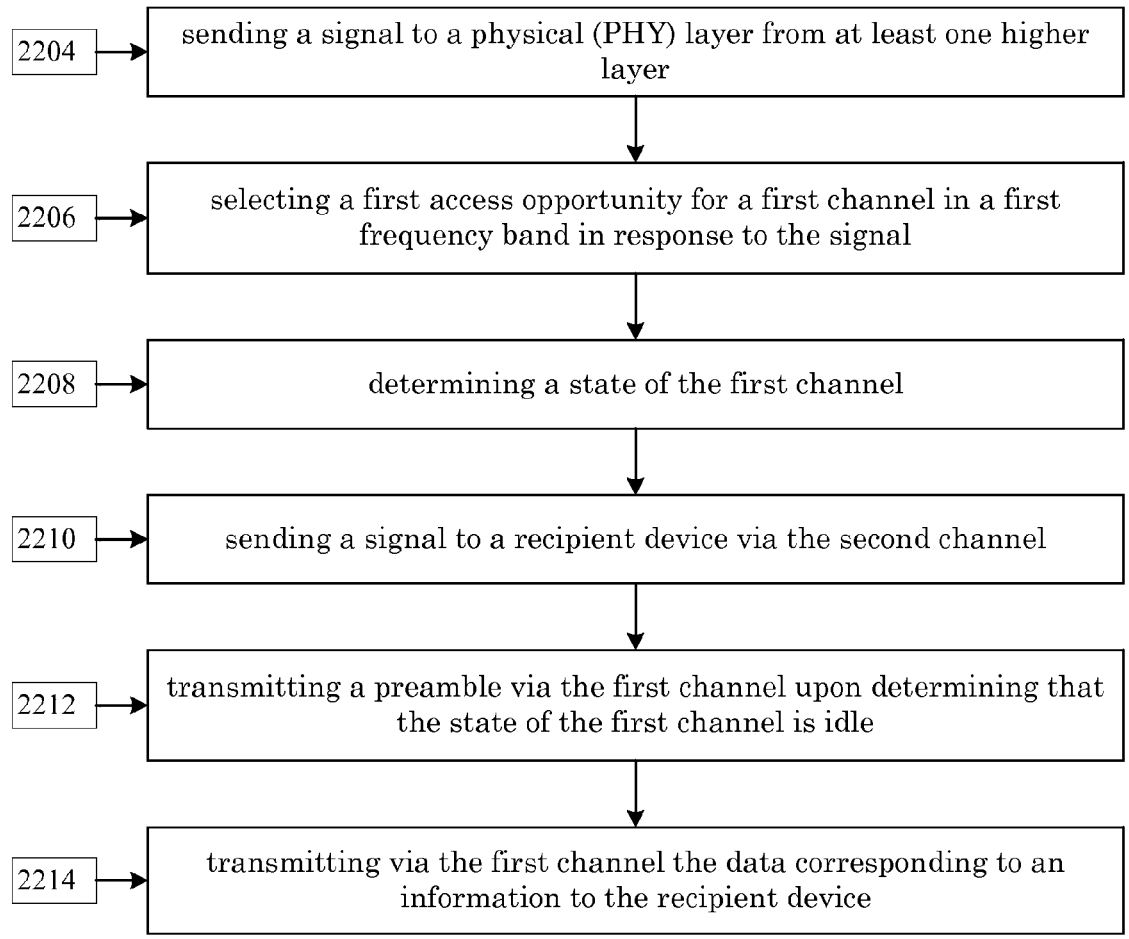
FIG. 22 illustrates an exemplary configuration scheme consistent with embodiments.

Referring to FIG. 22, alternately or additionally, embodiments contemplate a wireless transmit/receive device (WTRU) that may be configured to establish communication. At 2202, the WTRU configuration may include sending a signal to a physical (PHY) layer from at least one higher layer, and at 2204, selecting a first access opportunity for a first channel in a first frequency band in response to the signal. Embodiments contemplate that, at 2206, the configuration may include determining a state of the first channel, and at 2208, determining a second channel in the first frequency band upon a determination that the state of the first channel is idle. Embodiments contemplate that, at 2210, the WTRU configuration may include sending a signal to a recipient device via the second channel. The signal may include information for reception via the first channel of data corresponding to the information. Embodiments also contemplate that the first frequency band may be at least one of an unlicensed band or a lightly-licensed band.

Embodiments contemplate, at 2212, that the WTRU configuration may further comprise transmitting a preamble via the first channel upon determining that the state of the first channel is idle. At 2214, the WTRU configuration may further comprise transmitting via the first channel the data corresponding to the information to the recipient device. Embodiments contemplate that the second channel may be a control channel. Embodiments further contemplate that the preamble may include a sequence known to the recipient device and that the sequence may enable synchronization with the recipient device.

Figure 23:
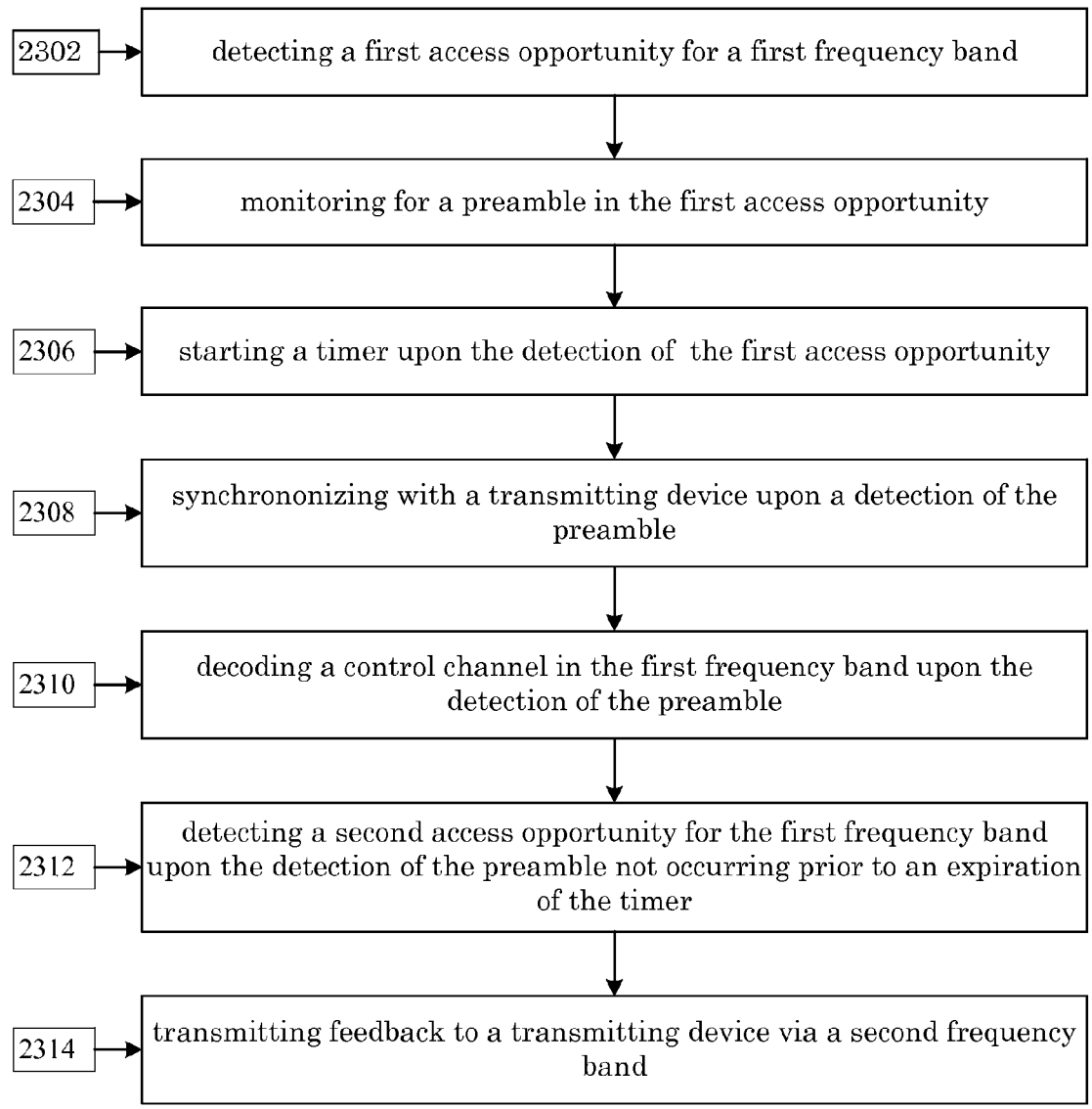
FIG. 23 illustrates an exemplary configuration scheme consistent with embodiments.

Referring to FIG. 23, alternatively or additionally, embodiments contemplate a wireless transmit/receive device (WTRU) that may be configured to establish communication. Embodiments contemplate that, at 2302, the WTRU configuration may include detecting a first access opportunity for a first frequency band. At 2304, the WTRU configuration may include monitoring for a preamble in the first access opportunity. At 2306, the WTRU configuration may include starting a timer upon the detection of the first access opportunity. At 2308, the WTRU configuration may include synchronizing with a transmitting device upon a detection of the preamble. At 2310, the WTRU configuration may include decoding a control channel in the first frequency band upon the detection of the preamble. Embodiments contemplate that the first frequency band may be at least one of an unlicensed band or a lightly-licensed band.

Embodiments further contemplate that, at 2312, the WTRU configuration may comprise detecting a second access opportunity for the first frequency band upon the detection of the preamble not occurring prior to an expiration of the timer. At, 2314, the configuration may further comprise transmitting feedback to a transmitting device via a second frequency band. Embodiments contemplate that the second frequency band may be a licensed band.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A wireless transmit/receive unit (WTRU), comprising:
    a receiver, the receiver configured, at least in part, to:
        receive, via a second channel in a second frequency band, a respective plurality of access opportunities, the respective plurality of access opportunities providing the first WTRU with coordinated uplink access to a first channel in a first frequency band, the first frequency band being at least one of: an unlicensed band, or a lightly-licensed band, and the second frequency band being a licensed band; and
    a processor, the processor configured, at least in part, to:
        sense for a preamble of a first transmission on the first downlink channel, the first transmission sent from an evolved NodeB (eNodeB) during a first access opportunity of the plurality of access opportunities, the first transmission being a downlink transmission;
        terminate reception during the first access opportunity until a later access opportunity upon the preamble of the first transmission being undetected;
        initiate reception of the first transmission on the first downlink channel during the first access opportunity upon the preamble being detected;
        transition the WTRU from a reception mode to a transmission mode after receipt of the first transmission; and
        initiate a second transmission to the eNodeB on a third channel in the first frequency band.

2. The WTRU of claim 1, wherein the processor is further configured such that the second transmission to the eNodeB on the third channel is further initiated without a determination of an occurrence of a second access opportunity.

3. The WTRU of claim 1, wherein the processor is further configured such that the second transmission to the eNodeB on the third channel is further initiated after a determination of an occurrence of a second access opportunity.

4. A method, comprising:
    receiving, by a wireless transmit/receive unit (WTRU) via a second channel in a second frequency band, a respective plurality of access opportunities, the respective plurality of access opportunities providing the WTRU with coordinated access to a first downlink channel in a first frequency band, the first frequency band being at least one of: an unlicensed band, or a lightly-licensed band, and the second frequency band being a licensed band;
    sensing for a preamble of a first transmission on the first downlink channel, the first transmission sent from an evolved NodeB (eNodeB) during a first access opportunity of the plurality of access opportunities, the first transmission being a downlink transmission;
    terminating reception during the first access opportunity until a later access opportunity upon the preamble of the first transmission being undetected;
    receiving the first transmission on the first downlink channel during the first access opportunity upon the preamble being detected;
    transitioning the WTRU from a reception mode to a transmission mode after receipt of the first transmission; and
    sending a second transmission to the eNodeB on a third channel of the first frequency band.

5. The method of claim 4, wherein the sending the second transmission to the eNodeB on the third channel is further done without determining an occurrence of a second access opportunity.

6. The method of claim 4, wherein the sending the second transmission to the eNodeB on the third channel is further done after determining an occurrence of a second access opportunity.

* * * * *